United States Patent
Fong et al.

(10) Patent No.: US 12,004,173 B2
(45) Date of Patent: Jun. 4, 2024

(54) SEMI-PERSISTENT SCHEDULING CONFIGURATIONS FOR SIDELINK COMMUNICATIONS

(71) Applicant: QUALCOMM Incorporated, San Diego, CA (US)

(72) Inventors: Lik Hang Silas Fong, Bridgewater, NJ (US); Jing Sun, San Diego, CA (US); Piyush Gupta, Bridgewater, NJ (US); Xiaojie Wang, Hillsborough, NJ (US); Yisheng Xue, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/327,211

(22) Filed: May 21, 2021

(65) Prior Publication Data

US 2022/0015133 A1    Jan. 13, 2022

Related U.S. Application Data

(60) Provisional application No. 63/049,019, filed on Jul. 7, 2020.

(51) Int. Cl.
*H04W 72/14* (2009.01)
*H04L 1/00* (2006.01)
(Continued)

(52) U.S. Cl.
CPC ............ *H04W 72/23* (2023.01); *H04L 1/0061* (2013.01); *H04W 72/1263* (2013.01); *H04W 72/535* (2023.01)

(58) Field of Classification Search
CPC .............. H04W 72/14; H04W 72/1257; H04W 72/1263; H04W 72/1278; H04W 72/1294;
(Continued)

(56) References Cited

U.S. PATENT DOCUMENTS

2018/0098349 A1* 4/2018 Sun .................. H04W 72/20
2019/0141694 A1* 5/2019 Gupta .............. H04W 72/1268
(Continued)

FOREIGN PATENT DOCUMENTS

EP    3498023    * 8/2017 ............ H04W 4/021

OTHER PUBLICATIONS

CATT: "Leftover Issues for Sidelink Configured Grant", 3GPP Draft; R2-1914447, 3GPP TSG-RAN WG2 Meeting #108, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, Nov. 8, 2019 (Nov. 8, 2019), XP051816529, pp. 1-6, Retrieved from the Internet: URL:https://ftp.3gpp.org/tsg_ran/WG2_RL2/TSGR2_108/Docs/R2-1914447.zip R2-1914447.docx [retrieved on Nov. 8, 2019] the whole document.

(Continued)

*Primary Examiner* — Phong La
(74) *Attorney, Agent, or Firm* — Holland & Hart / Qualcomm

(57) ABSTRACT

Methods, systems, and devices for wireless communications are described. A base station may send coupled configured grants to a transmitter user equipment (UE) and a receiver UE, respectively. For example, when transmitting a pair of configured grants that includes a first configured grant sent to a first UE and a second configured grant sent to a second UE, the base station may include an indication in each of the configured grants that sidelink semi-persistent scheduling resources are activated or deactivated. Additionally, the configured grants may indicate which UE is a receiver and which UE is a transmitter. For instance, the first configured grant may indicate that a first UE is to be the transmitter and a second configured grant indicate that a second UE is to be the receiver.

30 Claims, 21 Drawing Sheets

(51) Int. Cl.
*H04W 72/12* (2023.01)
*H04W 72/1263* (2023.01)
*H04W 72/23* (2023.01)
*H04W 72/50* (2023.01)

(58) Field of Classification Search
CPC ........... H04W 72/121; H04W 72/1205; H04W 72/12; H04L 1/0061
See application file for complete search history.

(56) References Cited

U.S. PATENT DOCUMENTS

| | | | | |
|---|---|---|---|---|
| 2019/0364590 | A1* | 11/2019 | Sartori | H04W 72/14 |
| 2020/0100215 | A1* | 3/2020 | Li | H04W 74/002 |
| 2020/0146048 | A1* | 5/2020 | Lee | H04W 72/535 |
| 2020/0163103 | A1* | 5/2020 | Kuang | H04W 72/23 |
| 2020/0305167 | A1* | 9/2020 | Freda | H04W 76/11 |
| 2021/0050953 | A1* | 2/2021 | Park | H04L 1/1819 |
| 2021/0058907 | A1* | 2/2021 | Fakoorian | H04W 72/042 |
| 2021/0105126 | A1* | 4/2021 | Yi | H04L 1/1671 |
| 2021/0136810 | A1* | 5/2021 | Kung | H04B 7/0626 |
| 2021/0153176 | A1* | 5/2021 | Lee | H04W 4/40 |
| 2021/0219143 | A1* | 7/2021 | Khalid | H04W 76/14 |
| 2021/0227620 | A1* | 7/2021 | Pan | H04L 1/1819 |
| 2021/0298052 | A1* | 9/2021 | Namba | H04L 1/1851 |
| 2021/0377993 | A1* | 12/2021 | Ayaz | H04W 72/21 |
| 2021/0400655 | A1* | 12/2021 | Fong | H04W 72/1278 |
| 2021/0410162 | A1* | 12/2021 | Kang | H04W 4/40 |
| 2021/0410175 | A1* | 12/2021 | Xue | H04W 72/0453 |
| 2022/0015110 | A1* | 1/2022 | Liang | H04W 72/0406 |
| 2022/0015133 | A1* | 1/2022 | Fong | H04L 1/0061 |
| 2022/0191919 | A1* | 6/2022 | Lee | H04W 28/26 |
| 2022/0200774 | A1* | 6/2022 | Yang | H04W 72/02 |
| 2022/0210815 | A1* | 6/2022 | Chen | H04L 1/1607 |

OTHER PUBLICATIONS

International Search Report and Written Opinion—PCT/US2021/033891—ISA/EPO—dated Oct. 7, 2021.

ITL: "Need of Clarification on NDI in SCI for Configured Grant Type 2", 3GPP Draft, R2-2001481, 3GPP TSG-RAN WG2 Meeting #109 electronic, 3rd Generation Partnership Project (3GPP), Mobile Competence Centre, 650, Route Des Lucioles, F-06921 Sophia-Antipolis Cedex, France, vol. RAN WG2. No. Online, Feb. 24, 2020-Mar. 6, 2020, Feb. 14, 2020 (Feb. 14, 2020), XP051849781, 4 Pages, Retrieved from the Internet: URL:https://ftp.3gpp.org/tsg_ran/WG2_RL2/TSGR2_109_e/Docs/R2-2001481.zip, R2-2001481.docx [retrieved on Feb. 14, 2020] the Whole Document.

Mediatek Inc: "NR Sidelink Mode-1 Resource Allocation", 3GPP Draft, 3GPP TSG RAN1 WG1 Meeting #97, R1-1906554, NR Sidelink Mode-1 Resource Allocation, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051728005, XP051708590, 7 pages, Retrieved from the Internet: URL: http://www.3gpp.org/ftp/Meetings%5F3GPP%5FSYNC/RAN1/Docs/R1%2D1906554%2Ezip, http://www.3gpp.org/ftp/Meetings%5F3GPP%5FSYNC/RAN1/Docs/R1%2D1906554%2Ezip [retrieved on May 13, 2019] the whole document.

* cited by examiner

SEMI-PERSISTENT SCHEDULING CONFIGURATIONS FOR SIDELINK COMMUNICATIONS

CROSS REFERENCE

The present Application for Patent claims the benefit of U.S. Provisional Patent Application No. 63/049,019 by Fong et al., entitled "SEMI-PERSISTENT SCHEDULING CONFIGURATIONS FOR SIDELINK COMMUNICATIONS," filed Jul. 7, 2020, assigned to the assignee hereof, and expressly incorporated by reference herein.

FIELD OF TECHNOLOGY

The following relates generally to wireless communications and more specifically to semi-persistent scheduling (SPS) configurations for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or network access nodes, each simultaneously supporting communication for multiple communication devices, which may be otherwise known as user equipment (UE). In some cases, two or more UEs may communicate with each other via sidelink communications. Additionally, the UEs may communicate with each other according to a semi-persistent scheduling (SPS) configuration. For example, the SPS configuration may allocate periodic resources to communicating sidelink messages between two UEs every 'X' slots (e.g., every slot, every second slot, every fourth slot, etc.). Efficient techniques are desired for enabling and supporting sidelink communications between UEs according to an SPS configuration.

SUMMARY

The described techniques relate to improved methods, systems, devices, and apparatuses that support semi-persistent scheduling (SPS) configurations for sidelink communications. Generally, the described techniques provide for a base station to indicate a configured grant pair configuration to two (or more) user equipment (UEs), where the configured grant pair configuration includes a sidelink SPS resource allocation for a sidelink channel that the two UEs can use for sidelink communications between each other. Subsequently, the base station may then transmit a first configured grant of a configured grant pair based on the configured grant pair configuration to a first UE of the two UEs, and may transmit a second configured grant of the configured grant pair based on the configured grant pair configuration to a second UE of the two UEs. Based on receiving the first configured grant and the second configured grant of the configured grant pair, the first UE and the second UE may determine that the sidelink SPS resource allocation is activated and may use the sidelink SPS resource allocation to communicate with each other (e.g., sidelink communications). The configured grant pair may represent coupled downlink control information (DCI) messages sent to each UE that carry the respective configured grants.

In some implementations, when transmitting each configured grant of the configured grant pair, the base station may indicate which UE is a transmitter and which UE is a receiver for the sidelink communications. For example, the base station may indicate the transmitter and receiver designations using an indication in the respective configured grants, using a bit in the respective configured grants, different DCI formats, different cyclic redundancy check (CRC) fields, or a combination thereof. Additionally, the base station may transmit indications with the configured grants of the configured grant pair to signal to the UEs that the SPS resource allocation is activated or deactivated. Subsequently, the UEs may transmit confirmation messages (e.g., via a medium access control (MAC) control element (CE)) to the base station to acknowledge that the SPS resource allocation has been activated or deactivated.

A method of wireless communications at a UE is described. The method may include receiving, from a base station, a configured grant pair configuration indicating a sidelink SPS resource allocation for a sidelink channel, receiving, from the base station, a first configured grant of a configured grant pair based on the configured grant pair configuration, the first configured grant indicating an activation of the sidelink SPS resource allocation for the sidelink channel, and communicating with a second UE on the sidelink channel according to the sidelink SPS resource allocation based on the first configured grant.

An apparatus for wireless communications at a UE is described. The apparatus may include a processor, memory coupled with the processor, and instructions stored in the memory. The instructions may be executable by the processor to cause the apparatus to receive, from a base station, a configured grant pair configuration indicating a sidelink SPS resource allocation for a sidelink channel, receive, from the base station, a first configured grant of a configured grant pair based on the configured grant pair configuration, the first configured grant indicating an activation of the sidelink SPS resource allocation for the sidelink channel, and communicate with a second UE on the sidelink channel according to the sidelink SPS resource allocation based on the first configured grant.

Another apparatus for wireless communications at a UE is described. The apparatus may include means for receiving, from a base station, a configured grant pair configuration indicating a sidelink SPS resource allocation for a sidelink channel, receiving, from the base station, a first configured grant of a configured grant pair based on the configured grant pair configuration, the first configured grant indicating an activation of the sidelink SPS resource allocation for the sidelink channel, and communicating with a second UE on the sidelink channel according to the sidelink SPS resource allocation based on the first configured grant.

A non-transitory computer-readable medium storing code for wireless communications at a UE is described. The code may include instructions executable by a processor to receive, from a base station, a configured grant pair configuration indicating a sidelink SPS resource allocation for a sidelink channel, receive, from the base station, a first configured grant of a configured grant pair based on the configured grant pair configuration, the first configured grant indicating an activation of the sidelink SPS resource allocation for the sidelink channel, and communicate with a second UE on the sidelink channel according to the sidelink SPS resource allocation based on the first configured grant.

In some examples of the method, apparatuses, and non-transitory computer-readable medium described herein, receiving the first configured grant may include operations, features, means, or instructions for receiving the first configured grant that indicates the UE is a transmitter for communications with the second UE on the sidelink channel.

In some examples of the method, apparatuses, and non-transitory computer-readable medium described herein, communicating with the second UE on the sidelink channel may include operations, features, means, or instructions for transmitting a sidelink message to the second UE via the sidelink SPS resource allocation based on the first configured grant indicating that the UE is the transmitter.

In some examples of the method, apparatuses, and non-transitory computer-readable medium described herein, receiving the first configured grant may include operations, features, means, or instructions for receiving the first configured grant including a bit set to indicate the UE is the transmitter.

In some examples of the method, apparatuses, and non-transitory computer-readable medium described herein, receiving the first configured grant may include operations, features, means, or instructions for receiving the first configured grant in a DCI format that indicates the UE is the transmitter.

In some examples of the method, apparatuses, and non-transitory computer-readable medium described herein, receiving the first configured grant may include operations, features, means, or instructions for receiving the first configured grant including a CRC field scrambled with a radio network temporary identifier (RNTI) that indicates the UE is the transmitter.

In some examples of the method, apparatuses, and non-transitory computer-readable medium described herein, receiving the first configured grant may include operations, features, means, or instructions for receiving the first configured grant that indicates that the UE is a receiver for communications with the second UE on the sidelink channel.

In some examples of the method, apparatuses, and non-transitory computer-readable medium described herein, communicating with the second UE on the sidelink channel may include operations, features, means, or instructions for receiving a sidelink message from the second UE via the sidelink SPS resource allocation based on the first configured grant indicating that the UE is the receiver.

In some examples of the method, apparatuses, and non-transitory computer-readable medium described herein, receiving the first configured grant may include operations, features, means, or instructions for receiving the first configured grant including a bit set to indicate the UE is the receiver.

In some examples of the method, apparatuses, and non-transitory computer-readable medium described herein, receiving the first configured grant may include operations, features, means, or instructions for receiving the first configured grant in a DCI format that indicates the UE is the receiver.

In some examples of the method, apparatuses, and non-transitory computer-readable medium described herein, receiving the first configured grant may include operations, features, means, or instructions for receiving the first configured grant including a CRC field scrambled with an RNTI that indicates the UE is the receiver.

In some examples of the method, apparatuses, and non-transitory computer-readable medium described herein, receiving the first configured grant may include operations, features, means, or instructions for receiving the first configured grant including a new data indicator set to a first value and a resource assignment field set to a second value to indicate the activation of the sidelink SPS resource allocation.

In some examples of the method, apparatuses, and non-transitory computer-readable medium described herein, receiving the first configured grant may include operations, features, means, or instructions for receiving the first configured grant including a field set to a first value to indicate the activation of the sidelink SPS resource allocation.

Some examples of the method, apparatuses, and non-transitory computer-readable medium described herein may further include operations, features, means, or instructions for receiving, from the base station, a DCI message that indicates to deactivate the sidelink SPS resource allocation for the sidelink channel.

Some examples of the method, apparatuses, and non-transitory computer-readable medium described herein may further include operations, features, means, or instructions for transmitting, to the base station, a confirmation message to acknowledge deactivation for the sidelink SPS resource allocation for the sidelink channel based on receiving the DCI message.

In some examples of the method, apparatuses, and non-transitory computer-readable medium described herein, transmitting the confirmation message may include operations, features, means, or instructions for transmitting a MAC CE including the confirmation message.

In some examples of the method, apparatuses, and non-transitory computer-readable medium described herein, receiving the first configured grant may include operations, features, means, or instructions for receiving the first configured grant including a CRC scrambled with an RNTI corresponding to the UE and an indication of the second UE for communications on the sidelink channel.

In some examples of the method, apparatuses, and non-transitory computer-readable medium described herein, receiving the first configured grant may include operations, features, means, or instructions for receiving an indication for a retransmission for communications on the sidelink channel according to the sidelink SPS resource allocation based on a sidelink RNTI specific to the UE used to scramble a CRC of the first configured grant, a new data indicator, a hybrid access request (HARQ) identifier field in the first configured grant, or a combination thereof.

In some examples of the method, apparatuses, and non-transitory computer-readable medium described herein, receiving the configured grant pair configuration may include operations, features, means, or instructions for receiving, from the base station, the configured grant pair configuration via a DCI message, radio resource control (RRC) signaling, or a combination thereof.

In some examples of the method, apparatuses, and non-transitory computer-readable medium described herein, receiving the first configured grant of the configured grant pair may include operations, features, means, or instructions for receiving, from the base station, a DCI message including the first configured grant of the configured grant pair.

Some examples of the method, apparatuses, and non-transitory computer-readable medium described herein may further include operations, features, means, or instructions for transmitting, to the base station, a confirmation message to acknowledge the activation for the sidelink SPS resource allocation for the sidelink channel based on receiving the first configured grant.

In some examples of the method, apparatuses, and non-transitory computer-readable medium described herein, transmitting the confirmation message may include operations, features, means, or instructions for transmitting a MAC CE including the confirmation message.

A method of wireless communications at a base station is described. The method may include transmitting, to a first UE and a second UE, a configured grant pair configuration indicating a sidelink SPS resource allocation for a sidelink channel, transmitting, to the first UE, a first configured grant of a configured grant pair based on the configured grant pair configuration, the first configured grant indicating activation of the sidelink SPS resource allocation for the sidelink channel, and transmitting, to the second UE, a second configured grant of the configured grant pair based on the configured grant pair configuration, the second configured grant indicating the activation of the sidelink SPS resource allocation for the sidelink channel.

An apparatus for wireless communications at a base station is described. The apparatus may include a processor, memory coupled with the processor, and instructions stored in the memory. The instructions may be executable by the processor to cause the apparatus to transmit, to a first UE and a second UE, a configured grant pair configuration indicating a sidelink SPS resource allocation for a sidelink channel, transmit, to the first UE, a first configured grant of a configured grant pair based on the configured grant pair configuration, the first configured grant indicating activation of the sidelink SPS resource allocation for the sidelink channel, and transmit, to the second UE, a second configured grant of the configured grant pair based on the configured grant pair configuration, the second configured grant indicating the activation of the sidelink SPS resource allocation for the sidelink channel.

Another apparatus for wireless communications at a base station is described. The apparatus may include means for transmitting, to a first UE and a second UE, a configured grant pair configuration indicating a sidelink SPS resource allocation for a sidelink channel, transmitting, to the first UE, a first configured grant of a configured grant pair based on the configured grant pair configuration, the first configured grant indicating activation of the sidelink SPS resource allocation for the sidelink channel, and transmitting, to the second UE, a second configured grant of the configured grant pair based on the configured grant pair configuration, the second configured grant indicating the activation of the sidelink SPS resource allocation for the sidelink channel.

A non-transitory computer-readable medium storing code for wireless communications at a base station is described. The code may include instructions executable by a processor to transmit, to a first UE and a second UE, a configured grant pair configuration indicating a sidelink SPS resource allocation for a sidelink channel, transmit, to the first UE, a first configured grant of a configured grant pair based on the configured grant pair configuration, the first configured grant indicating activation of the sidelink SPS resource allocation for the sidelink channel, and transmit, to the second UE, a second configured grant of the configured grant pair based on the configured grant pair configuration, the second configured grant indicating the activation of the sidelink SPS resource allocation for the sidelink channel.

In some examples of the method, apparatuses, and non-transitory computer-readable medium described herein, transmitting the first configured grant may include operations, features, means, or instructions for transmitting, to the first UE, the first configured grant indicating that the first UE is a transmitter for communications with the second UE on the sidelink channel.

In some examples of the method, apparatuses, and non-transitory computer-readable medium described herein, transmitting the first configured grant may include operations, features, means, or instructions for transmitting the first configured grant including a bit to indicate the first UE is the transmitter.

In some examples of the method, apparatuses, and non-transitory computer-readable medium described herein, transmitting the first configured grant may include operations, features, means, or instructions for transmitting the first configured grant in a DCI format that indicates the UE is the transmitter.

In some examples of the method, apparatuses, and non-transitory computer-readable medium described herein, transmitting the first configured grant may include operations, features, means, or instructions for transmitting the first configured grant including a CRC field scrambled with an RNTI that indicates the UE is the transmitter.

In some examples of the method, apparatuses, and non-transitory computer-readable medium described herein, transmitting the second configured grant may include operations, features, means, or instructions for transmitting, to the second UE, the second configured grant indicating that the second UE is a receiver for communications with the first UE on the sidelink channel.

In some examples of the method, apparatuses, and non-transitory computer-readable medium described herein, transmitting the second configured grant may include operations, features, means, or instructions for transmitting the second configured grant including a bit set to indicate the second UE is the receiver.

In some examples of the method, apparatuses, and non-transitory computer-readable medium described herein, transmitting the second configured grant may include operations, features, means, or instructions for transmitting the second configured grant in a DCI format that indicates the second UE is the receiver.

In some examples of the method, apparatuses, and non-transitory computer-readable medium described herein, transmitting the second configured grant may include operations, features, means, or instructions for transmitting the second configured grant including a CRC field scrambled with an RNTI that indicates the second UE is the receiver.

In some examples of the method, apparatuses, and non-transitory computer-readable medium described herein, transmitting each of the configured grant pair may include operations, features, means, or instructions for transmitting the first configured grant and the second configured grant that each include a new data indicator set to a first value and a resource assignment field set to a second value to indicate the activation of the sidelink SPS resource allocation.

In some examples of the method, apparatuses, and non-transitory computer-readable medium described herein, transmitting each of the configured grant pair may include operations, features, means, or instructions for transmitting the first configured grant and the second configured grant each that each include a field set to a first value to indicate the activation of the sidelink SPS resource allocation.

Some examples of the method, apparatuses, and non-transitory computer-readable medium described herein may further include operations, features, means, or instructions for transmitting, to the first UE, the second UE, or both, a DCI message that indicates to deactivate the sidelink SPS resource allocation for the sidelink channel.

Some examples of the method, apparatuses, and non-transitory computer-readable medium described herein may further include operations, features, means, or instructions for receiving, from the first UE, the second UE, or both, a confirmation message to acknowledge deactivation for the sidelink SPS resource allocation for the sidelink channel based on transmitting the DCI message.

In some examples of the method, apparatuses, and non-transitory computer-readable medium described herein, receiving the confirmation message may include operations, features, means, or instructions for receiving a MAC CE including the confirmation message.

Some examples of the method, apparatuses, and non-transitory computer-readable medium described herein may further include operations, features, means, or instructions for transmitting an indication of a resource assignment for the sidelink SPS resource allocation.

In some examples of the method, apparatuses, and non-transitory computer-readable medium described herein, transmitting each of the configured grant pair may include operations, features, means, or instructions for transmitting the first configured grant including a first CRC scrambled with a first RNTI corresponding to the first UE and an indication of the second UE, and transmitting the second configured grant including a second CRC scrambled with a second RNTI corresponding to the second UE and an indication of the first UE.

Some examples of the method, apparatuses, and non-transitory computer-readable medium described herein may further include operations, features, means, or instructions for transmitting an indication for a retransmission on the sidelink channel according to the sidelink SPS resource allocation based on a first sidelink RNTI specific to the first UE used to scramble a first CRC of the first configured grant, a second sidelink RNTI specific to the second UE used to scramble a second CRC of the second configured grant, a new data indicator in each of the configured grant pair, a HARQ identifier field in each of the configured grant pair, or a combination thereof.

In some examples of the method, apparatuses, and non-transitory computer-readable medium described herein, transmitting the configured grant pair configuration may include operations, features, means, or instructions for transmitting, to the first UE, the second UE, or both, the configured grant pair configuration via a DCI message, RRC signaling, or a combination thereof.

In some examples of the method, apparatuses, and non-transitory computer-readable medium described herein, transmitting each of the configured grant pair may include operations, features, means, or instructions for transmitting, to the first UE, a first DCI message of coupled DCI messages including the first configured grant of the configured grant pair, and transmitting, to the second UE, a second DCI message of the coupled DCI messages including the second configured grant of the configured grant pair.

Some examples of the method, apparatuses, and non-transitory computer-readable medium described herein may further include operations, features, means, or instructions for receiving, from the first UE, the second UE, or both, a confirmation message to acknowledge the activation for the sidelink SPS resource allocation for the sidelink channel.

In some examples of the method, apparatuses, and non-transitory computer-readable medium described herein, receiving the confirmation message may include operations, features, means, or instructions for receiving a MAC CE including the confirmation message.

DETAILED DESCRIPTION

Figure 1:
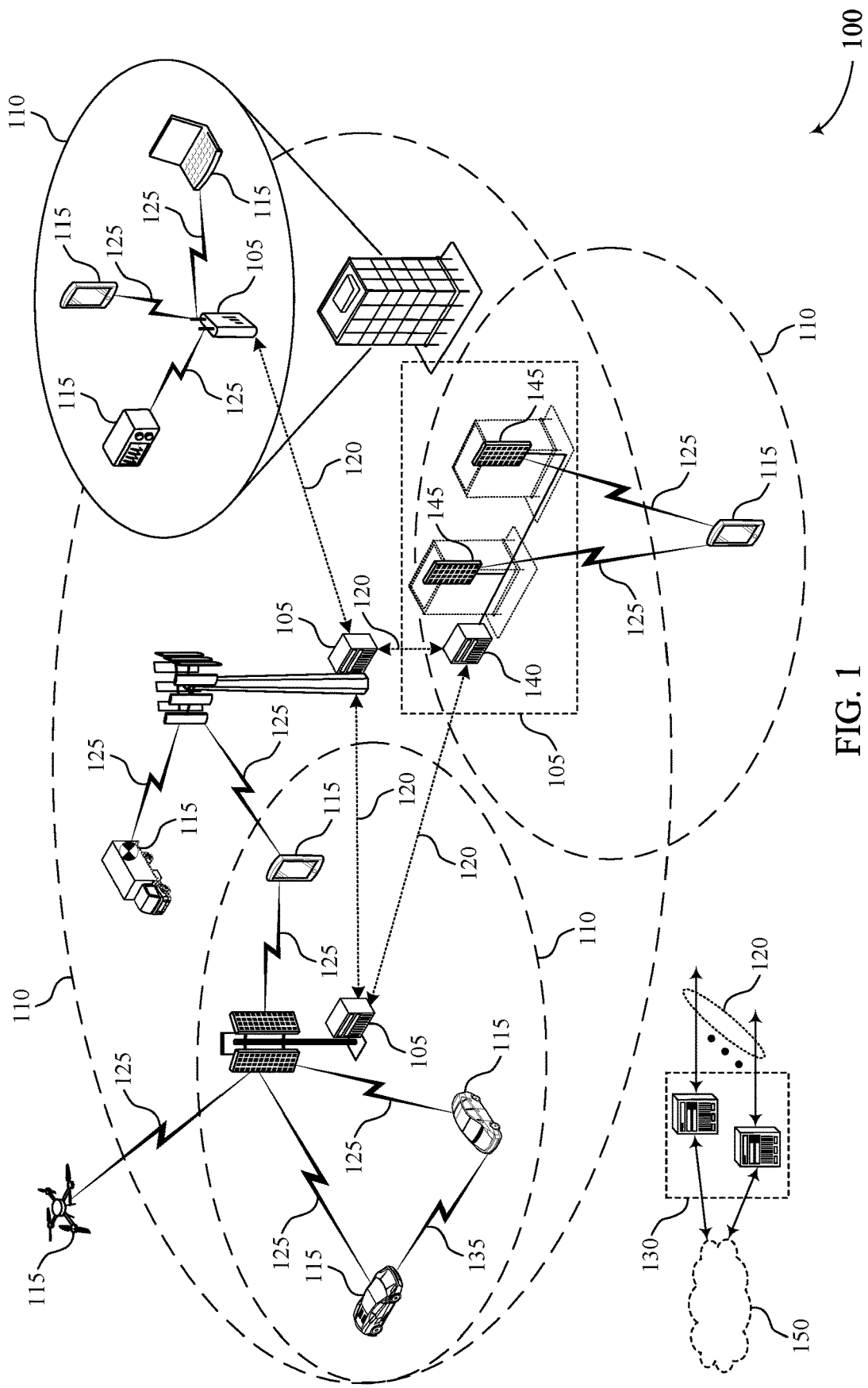
FIG. 1 illustrates an example of a system for wireless communications in accordance with aspects of the present disclosure.

In some wireless communications systems, a first user equipment (UE) may communicate with a second UE over sidelink communications. To enable the sidelink communications, a base station may indicate a configured grant pair configuration to the two UEs, where the configured grant pair configuration includes a sidelink semi-persistent scheduling (SPS) resource allocation for a sidelink channel that the two UEs can use for the sidelink communications. Subsequently, the base station may then transmit a first configured grant of a configured grant pair based on the configured grant pair configuration to the first UE and may transmit a second configured grant of the configured grant pair based on the configured grant pair configuration to the second UE. Based on receiving the first configured grant and the second configured grant of the configured grant pair, the first UE and the second UE may determine that the sidelink SPS resource allocation is activated and may use the sidelink SPS resource allocation to communicate with each other (e.g., sidelink communications). The configured grant pair may represent coupled downlink control information (DCI) messages sent to each UE that carry the respective configured grants.

Previously, for sidelink communications, a base station may schedule sidelink resources to be used by multiple (e.g., two) UEs for sidelink transmissions (e.g., the base station controls resource allocation for the sidelink communications). In industrial internet of things (I-IoT) systems, the base station controls a resource allocation for each sidelink channel. Prior to using the allocated sidelink resources for sidelink transmissions, the UEs may transmit control information messages (e.g., sidelink control information (SCI) messages) to communicate control information to enable the sidelink transmissions. However, transmitting SCI increases control overhead, especially when the sidelink traffic is deterministic and periodic. Moreover, conventional systems do not provide a mechanism whereby a configured grant activates or deactivates a semi-static allocation of sidelink resources.

As described herein, a base station may send coupled configured grants (e.g., a configured grant pair, coupled DCI messages, etc.) to a transmitter UE and a receiver UE, respectively, so that no extra DCIs and SCIs are needed when periodic data is to be sent on a sidelink channel (e.g., a physical sidelink shared channel (PSSCH)). For example, when transmitting a pair of configured grants that includes a first configured grant sent to a first UE and a second configured grant sent to a second UE, the base station may include an indication in each of the configured grants that sidelink SPS resources are activated or deactivated. Additionally, the configured grants may indicate which UE is a receiver and which UE is a transmitter. For instance, the first configured grant may indicate that a first UE is to be the transmitter (e.g., include a bit set to a first value or use a first DCI format for transmitters) and a second configured grant may indicate that a second UE is to be the receiver (e.g., include a bit set to a second value or use a second DCI format for receivers).

Aspects of the disclosure are initially described in the context of wireless communications systems. Additionally, aspects of the disclosure are illustrated through an additional wireless communications system, a sidelink communications configuration, a sidelink feedback configuration, and a process flow. Aspects of the disclosure are further illustrated by and described with reference to apparatus diagrams, system diagrams, and flowcharts that relate to SPS configurations for sidelink communications.

FIG. 1 illustrates an example of a wireless communications system 100 that supports SPS configurations for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, sidelink communications may be supported, in which a first UE 115 can communicate directly with a second UE 115. To enable the sidelink communications, a base station 105 may control a resource allocation of a sidelink channel and may indicate the resource allocation to the first UE 115, the second UE 115, or both. Prior to using the resource allocation of the sidelink channel for the sidelink communications, the UEs 115 may transmit control information messages (e.g., SCI messages) to communicate control information to enable the sidelink communications. However, transmitting SCI may increase signaling and control overhead.

Additionally, in some cases, sidelink communications between two UEs 115 may occur according to a SPS configuration. For example, a first UE 115 of the two UEs 115 may transmit a sidelink message to a second UE 115 of the two UEs 115 every 'X' slots (e.g., every slot, every second slot, every fourth slot, etc.) or every 'X' TTIs. That is, the sidelink communications may occur in a deterministic and periodic configuration (e.g., cyclic message exchanges). As such, if both UEs 115 identify the SPS configuration, any control information messages communicated between the two UEs 115 (e.g., the SCI messages) may be unnecessary, and transmitting such signaling for known or determined periodic sidelink traffic may increase signaling overhead and increase latency.

Wireless communications system 100 may support efficient techniques for indicating a configured grant pair configuration for a sidelink SPS resource allocation of a sidelink channel that two UEs 115 can use for sidelink communications between each other. For example, a base station 105 may transmit a first configured grant of a configured grant pair based on the configured grant pair configuration to a first UE 115 of the two UEs 115 and may transmit a second configured grant of the configured grant pair based on the configured grant pair configuration to a second UE 115 of the two UEs 115. Based on receiving the first configured grant and the second configured grant of the configured grant pair, the first UE 115 and the second UE 115 may determine that the sidelink SPS resource allocation is activated and may use the sidelink SPS resource allocation to communicate with each other (e.g., sidelink communications). Additionally, each configured grant of the configured grant pair may include an indication that sidelink SPS resources are activated or deactivated and an indication of which UE 115 is a receiver and which UE 115 is a transmitter for the sidelink communications. As such, the first UE 115 and the second UE 115 may communicate on the sidelink channel without transmitting SCIs or receiving additional control information (e.g., DCIs) from the base station 105.

Figure 2:
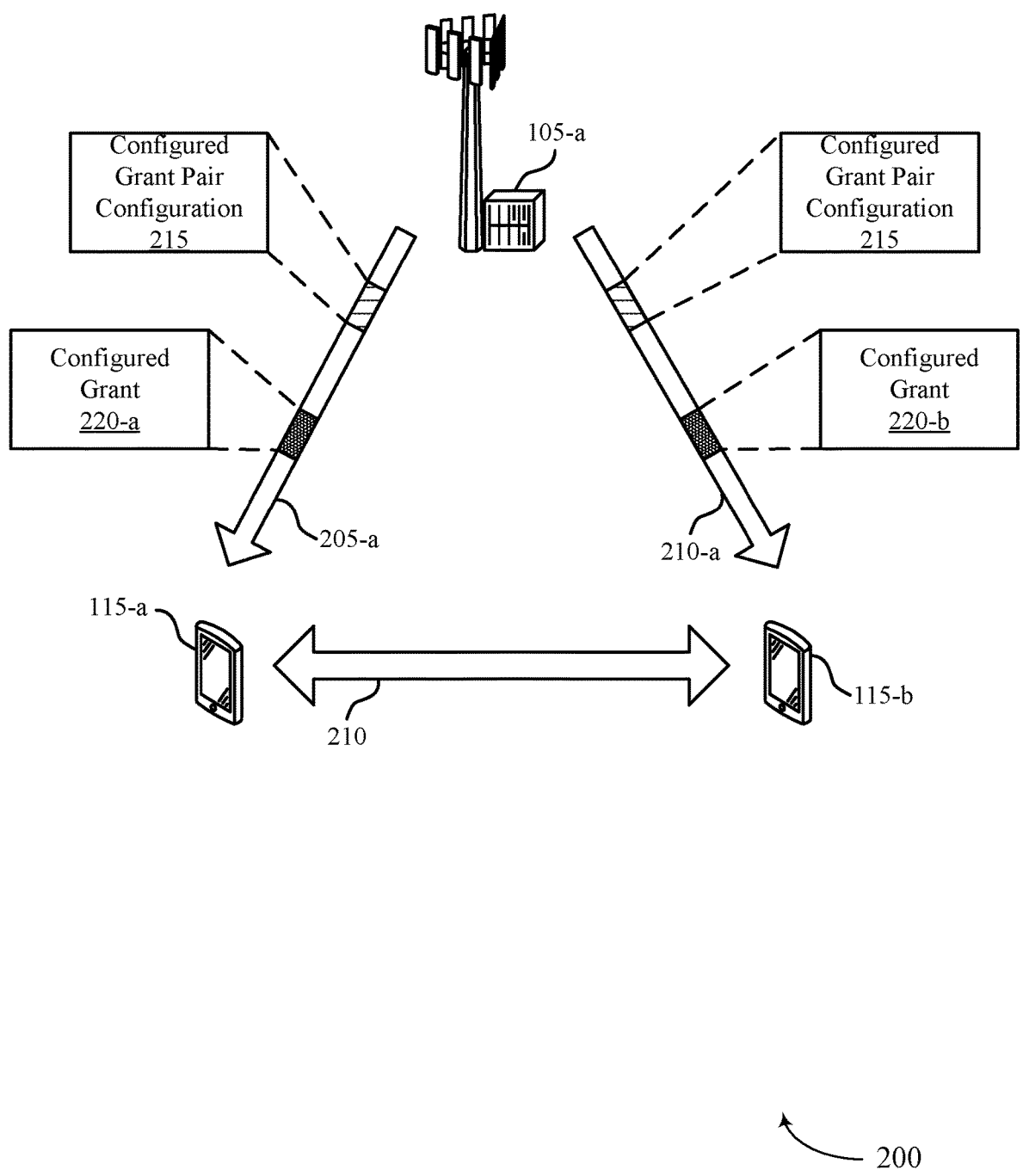
FIG. 2 illustrates an example of a wireless communications system in accordance with aspects of the present disclosure.

FIG. 2 illustrates an example of a wireless communications system 200 that supports SPS configurations for sidelink communications in accordance with aspects of the present disclosure. In some examples, wireless communications system 200 may implement aspects of wireless communications system 100. For example, wireless communications system 200 may include a base station 105-$a$, a UE 115-$a$, and a UE 115-$b$, which may represent examples of corresponding base stations 105 and UEs 115, respectively, as described with reference to FIG. 1. Additionally, wireless communications system 200 may support sidelink communications for direct transmissions between UE 115-$a$ and UE 115-$b$. Base station 105-$a$ and UE 115-$a$ may communicate on resources of a carrier 205-$a$, base station 105-$a$ and UE 115-$b$ may communicate on resources of a carrier 205-$b$, and UE 115-$a$ and UE 115-$b$ may communicate on resources of a sidelink channel 210.

In some cases, base station 105-$a$ may control resource allocations for one or more sidelink channels between UEs 115 connected to base station 105-$a$. For example, UE 115-$a$ and UE 115-$b$ may be UEs 115 in an I-IoT system (or a V2X system) managed by base station 105-$a$, where base station 105-$a$ controls resource allocations of sidelink channel 210 to enable sidelink communications between UE 115-$a$ and UE 115-$b$. However, base station 105-$a$ may not know which UE 115 is a receiver UE 115 when delivering a grant (e.g., a dynamic grant, a configured grant, etc.) to a transmitter UE 115 for indicating the resource allocation for the sidelink communications between UE 115-$a$ and UE 115-$b$.

As described herein, base station 105-$a$ may send coupled DCIs to UE 115-$a$ and UE 115-$b$, each DCI of the coupled DCIs containing a grant transmitted to the transmitter UE 115 and the receiver UE 115, respectively, so that no SCIs are needed when the data is sent on sidelink channel 210 (e.g., a physical sidelink shared channel (PSSCH)). Additionally, the traffic between UE 115-$a$ and UE 115-$b$ on sidelink channel 210 may occur periodically and deterministically according to an SPS configuration. As such, the grants transmitted to UE 115-$a$ and UE 115-$b$ may include configured grants to allocate sidelink SPS resources that can be used for the periodic traffic (e.g., in addition to or alternative to dynamic grants). For example, base station 105-$a$ may transmit a configured grant pair configuration 215 to both UE 115-$a$ and UE 115-$b$ to indicate the coupled DCIs and a sidelink SPS resource allocation. Subsequently, base station 105-$a$ may then transmit a first configured grant 220-$a$ to UE 115-$a$ and a second configured grant 220-$b$ to UE 115-$b$, where first configured grant 220-$a$ and second configured grant 220-$b$ constitute the coupled DCIs or coupled configured grants.

By transmitting the coupled DCIs containing the configured grants 220 to the respective UEs 115, base station 105-$a$ may alleviate the need for extra DCIs and SCIs when periodic data is sent on sidelink channel 210. For example, periodic DCIs and SCIs may be omitted for deterministic and periodic traffic. Additionally, the coupled DCIs containing the configured grants 220 may indicate an activation for sidelink SPS to signal to the UEs 115 that the sidelink SPS resource allocation on sidelink channel 210 is available to be used by UE 115-$a$ and UE 115-$b$ for sidelink communications.

In some implementations, base station 105-$a$ may transmit a sidelink SPS indicator through CRC scrambling in each configured grant 220. For example, base station 105-$a$ may use a node-specific radio network temporary identifier (RNTI) for scrambling the CRC of each configured grant 220 (e.g., DCI message) used for activating or deactivating the sidelink SPS resource allocation, while the other node associated with the sidelink SPS communications may be indicated in an additional field of each configured grant 220 (e.g., DCI field). That is, as an example, base station 105-*a* may transmit first configured grant 220-*a* using an RNTI corresponding to UE 115-*a* to scramble the CRC of configured grant 220-*a*, and configured grant 220-*a* may also include an indication of UE 115-*b* (e.g., in the additional field, DCI field, etc.). Additionally, base station 105-*a* may transmit second configured grant 220-*b* using an RNTI corresponding to UE 115-*b* to scramble the CRC of configured grant 220-*b*, and configured grant 220-*b* may also include an indication of UE 115-*a*. As such, each UE 115 may identify which configured grant 220 is intended for itself (e.g., based on the node-specific RNTI used for scrambling the corresponding CRC of the configured grant 220) and may also determine which UE 115 to communicate with for the sidelink communications using the sidelink SPS resource allocation.

When activating the sidelink SPS resource allocations using the configured grants 220, base station 105-*a* may also indicate which UE 115 is a transmitter for the sidelink communications (e.g., a transmitter designation) and which UE 115 is a receiver for the sidelink communications (e.g., a receiver designation). In some implementations, base station 105-*a* may use same DCI formats for activating or deactivating the sidelink SPS resource allocation at the transmitter side and at the receiver side but may indicate which UE 115 is the transmitter and which UE 115 is the receiver by using different field values. For example, each configured grant 220 (e.g., each DCI of the coupled DCIs) may contain a bit indicating whether the recipient of the configured grant 220 should view itself as a transmitter UE 115 or a receiver UE 115. By using same DCI formats and indicating the transmitter and receiver using the different field values, base station 105-*a* may use node-specific RNTIs (e.g., sidelink configured scheduling RNTIs (SL-CS-RNTIs) for both the transmitter UE 115 and the receiver UE 115. Alternatively, the transmitter designation and the receiver designation may not be differentiated by different field values, and base station 105-*a* may indicate which UE 115 is the receiver and which UE 115 is the transmitter based on destination-node-specific RNTIs (e.g., a SL-CS-RNTI specific to the receiver (SL-CS-Rx-RNTI) and a SL-CS-RNTI specific to the transmitter (SL-CS-Tx-RNTI)).

Additionally or alternatively, to indicate which UE 115 is the transmitter for the sidelink communications and which UE 115 is the receiver for the sidelink communications, base station 105-*a* may use different DCI formats for the respective configured grants 220 when transmitting the configured grants to activate or deactivate the sidelink SPS resource allocation at the transmitter and at the receiver. For example, base station 105-*a* may transmit first configured grant 220-*a* using a first DCI format to indicate whether UE 115-*a* is the transmitter or the receiver and may transmit second configured grant 220-*b* using a second DCI format to indicate whether UE 115-*b* is the complementary receiver or transmitter for the sidelink communications. By using the different DCI formats for transmitting the configured grants 220, base station 105-*a* may use the node-specific RNTIs (e.g., SL-CS-RNTI) for both the transmitter UE 115 and the receiver UE 115.

As described previously, the coupled DCIs containing the configured grants 220 may indicate an activation (or deactivation) for the sidelink SPS resource allocation. In some implementations, base station 105-*a* may implicitly indicate the activation of the sidelink SPS resource allocation using fields inside the coupled DCIs and configured grants 220. For example, base station 105-*a* may indicate activation of the sidelink SPS resource allocation by using a CRC in the DCI to indicate sidelink SPS communications, including a new data indicator bit in the DCI set to a value (e.g., '0'), and indicating frequency and time resource assignments for the sidelink SPS communications. If the UEs 115 receiving these DCIs and configured grants 220 determine the CRC indicates SPS communications, no new data is incoming, and that the frequency and time resource assignments are feasible, the UEs 115 may determine the sidelink SPS resource allocation indicated are activated. Alternatively, if base station 105-*a* includes a same new data indicator (e.g., set to '0') in the DCI but the frequency and time resource assignments are all set to zeros, the UEs 115 may determine the sidelink SPS resource allocation is deactivated. Rather than using implicit indications to activate or deactivate the sidelink SPS resource allocation, base station 105-*a* may use an explicit field in the DCI or configured grant 220 to indicate activation or deactivation.

On the UE side, after receiving configured grant pair configuration 215 indicating the sidelink SPS resource allocation and the coupled DCIs and corresponding configured grants 220, UE 115-*a* and UE 115-*b* may monitor a downlink channel (e.g., a physical downlink control channel (PDCCH) for possible activation or deactivation of the sidelink SPS resource allocation for the sidelink communications. While monitoring, UE 115-*a* and UE 115-*b* may receive first configured grant 220-*a* and second configured grant 220-*b*, respectively. If each UE 115 determines a CRC of the respective configured grant 220 (e.g., DCI) indicates sidelink SPS, then each UE 115 may identify itself as the transmitter or the receiver (e.g., from the DCI or configured grant 220). Additionally, each UE 115 may identify whether the DCI indicates activation or deactivation of the sidelink SPS resource allocation. If the activation or deactivation is tied to an existing configuration (e.g., an indicated sidelink SPS resource allocation) as indicated in the DCI (e.g., configured grant 220), each UE 115 may activate or deactivate the corresponding configuration. Alternatively, if the activation or deactivation is not tied to an existing configuration, each UE 115 may store and activate the configuration as indicated in the DCI. Subsequently, if activated, the UEs 115 may send or receive SPS data through sidelink channel 210 (e.g., PSSCH) according to every stored configuration and may refrain from sending SCIs with the SPS data.

Additionally, UE 115-*a* and UE 115-*b* may monitor the downlink channel (e.g., PDCCH) for possible retransmission instructions from base station 105-*a*. For example, for sidelink communications on sidelink channel 210, base station 105-*a* may indicate a HARQ process and a retransmission strategy using the coupled DCIs and configured grants 220. For a dynamic retransmission, retransmissions on sidelink channel 210 may occur on dynamic resources granted by base station 105-*a*. Base station 105-*a* may indicate this retransmission grant (e.g., using the configured grants 220) using several fields inside the DCI carrying the configured grants 220. For example, base stations 105-*a* may use a node-specific sidelink RNTI or a sidelink RNTI specific to a receiver (e.g., sidelink receiver RNTI (SL-Rx-RNTI)) to scramble the CRC of each DCI of the coupled DCIs (e.g., each configured grant 220), may set the new data indicator to '1,' and may set a HARQ identifier field inside the DCI to equal a HARQ identifier of the sidelink SPS communications.

Figure 3A:
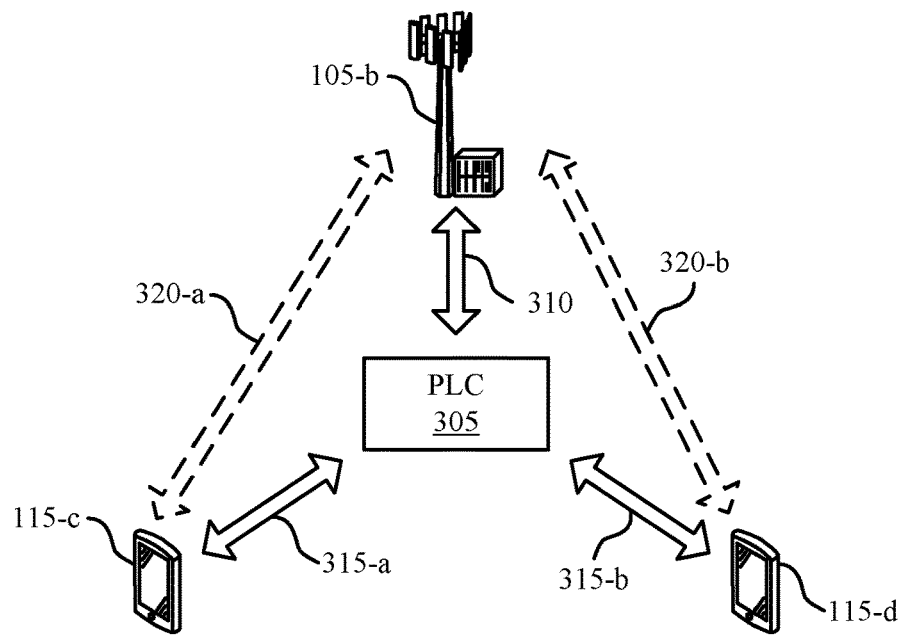
FIGS. 3A and 3B illustrate examples of a sidelink communications configuration in accordance with aspects of the present disclosure.
Figure 3B:
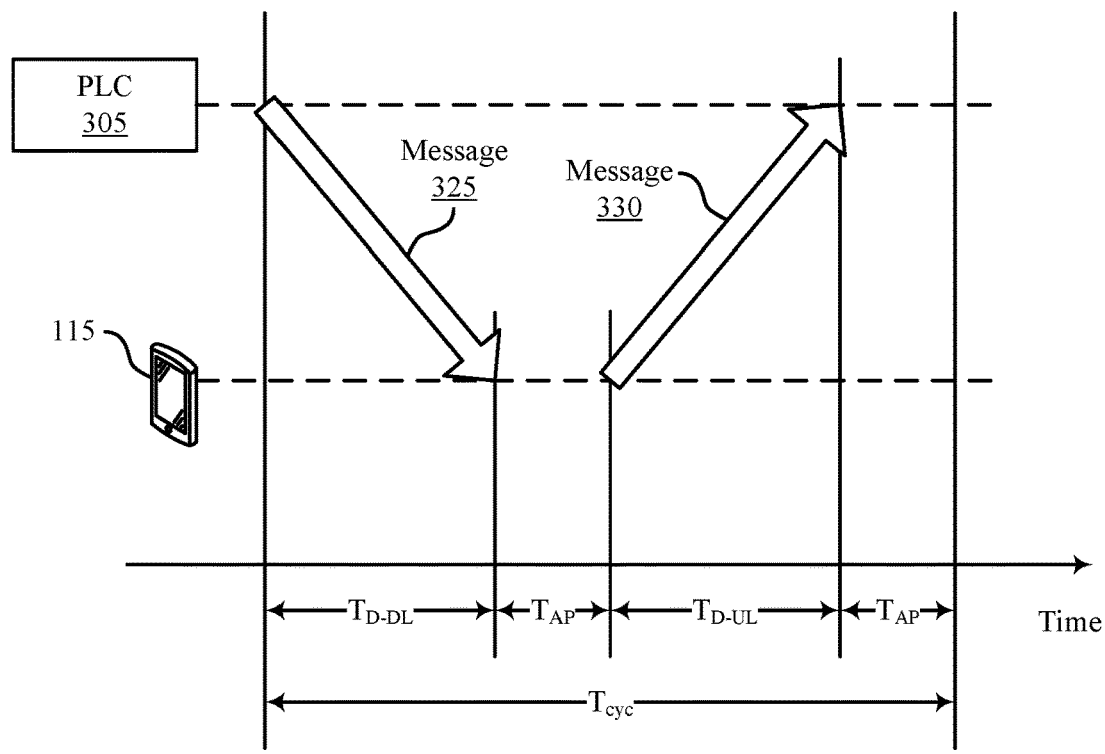

FIGS. 3A and 3B illustrate an example of a sidelink communications configuration 300 and 301 in accordance with aspects of the present disclosure. In some examples, sidelink communications configuration 300 and 301 may implement aspects of wireless communications systems 100 and 200. For example, sidelink communications configuration 300 and 301 may include a base station 105-*b*, a UE 115-*c*, and a UE 115-*d*, which may represent examples of base stations 105 and UEs 115, respectively, as described with reference to FIGS. 1 and 2. In some cases, sidelink communications configuration 300 and 301 may represent a factory automation system (e.g., I-IoT), where UE 115-*c* and UE 115-*d* represent sensors/actuators (S/As).

Additionally, sidelink communications configuration 300 and 301 may include a programmable logic controller (PLC) 305 (e.g., a wireless PLC). The PLC 305 may provide cyclic exchanges between base station 105-*b*, UE 115-*c*, and UE 115-*d*. In some cases, base station 105-*b* may transmit mission-critical traffic to UE 115-*c* and UE 115-*d* via PLC 305, where the mission-critical traffic is deterministic and periodic (e.g., transmitted according to a periodic schedule or an SPS). For example, base station 105-*b* may communicate with PLC 305 on resources of a carrier 310, and PLC 305 may then communicate with UE 115-*c* on resources of a carrier 315-*a* and with UE 115-*d* on resources of a carrier 315-*b*. Additionally or alternatively, UE 115-*c* may communicate directly with base station 105-*b* on resources of a carrier 320-*a*, and UE 115-*d* may also communicate directly with base station 105-*b* on resources of a carrier 320-*b*.

In some cases, the communications between PLC 305 and the UEs 115 may include small application-layer payloads (e.g., 40 to 256 bytes), where signaling overhead is minimized due to various headers. Additionally, the communications may include stringent latency and reliability requirements (e.g., for the mission-critical traffic). For example, the latency requirements may include one (1) to two (2) ms of latency, and the reliability requirement may include a reliability of $10^{-6}$. In some cases, both data and control channels may be designed to meet overall reliability and latency requirements. For example, as seen in sidelink communications configuration 301, PLC 305 may transmit a message 325 (e.g., a downlink telegram) to a UE 115, where transmission of the message 325 may elapse a first amount of time (TD-DL). The UE 115 may then take a second amount of time ($T_{AP}$) to process the message 325 and to prepare a message 330 with which to respond to PLC 305. Subsequently, the UE 115 may transmit the message 330 (e.g., uplink telegram) to PLC 305, where transmission of the message 330 elapses a third amount of time (TD-UL). PLC 305 may then take a fourth amount of time ($T_{AP}$) to process the message 330. Each of these times may add to a cycle time ($T_{cyc}$) for communicating a message between PLC 305 and the UE 115, where the cycle time has to meet the latency requirement.

As part of the factory automation system, a large number of S/As (e.g., UEs 115) may be present per PLC (e.g., about 20-50 S/As per PLC), and many PLCs may be present in a facility (e.g., 100-1000 PLCs). Making PLC connectivity wireless may reduce reconfiguration costs on a factory floor. In some cases, PLCs may be located close to machinery (e.g., S/As, UEs 115, etc.), and base stations 105 (e.g., base station 105-*b*) may be ceiling-mounted. PLC 305 may communicate with the S/As (e.g., UE 115-*c* and UE 115-*d*) on sidelinks (e.g., carriers 315) through a PC5 interface to support the sidelink communications, and PLC 305 may communicate with base station 105-*b* on carrier 310 through a Uu interface.

By using the techniques described herein, base station 105-*b* may activate or deactivate a sidelink SPS resource allocation by transmitting coupled DCIs and configured grants to UE 115-*c* and UE 115-*d* directly or through PLC 305. Subsequently, after the sidelink SPS resource allocation is activated, UE 115-*c* and UE 115-*d* may then communicate with each other directly or through PLC 305.

Figure 4A:
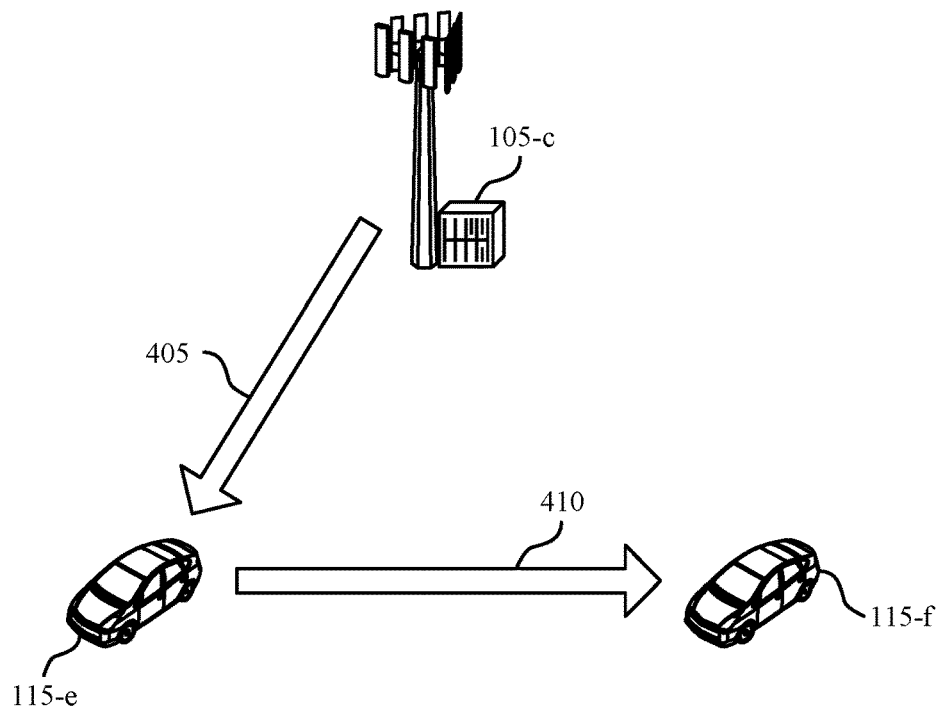
FIGS. 4A and 4B illustrate examples of a sidelink feedback configuration in accordance with aspects of the present disclosure.
Figure 4B:
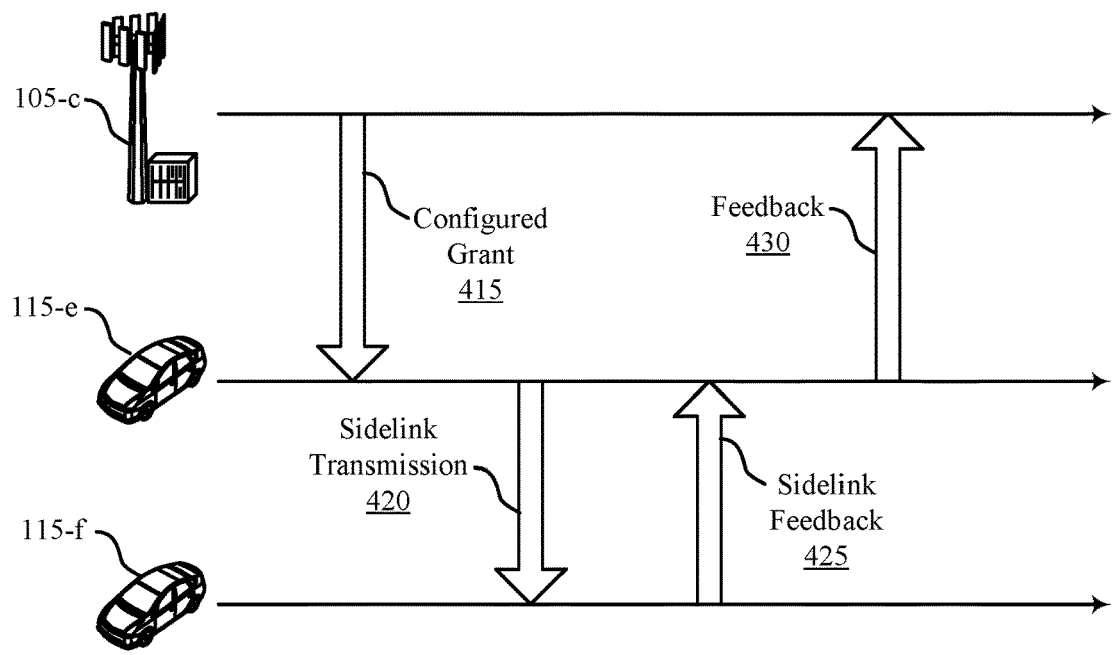

FIGS. 4A and 4B illustrate an example of a sidelink feedback configuration 400 and 401 in accordance with aspects of the present disclosure. In some examples, sidelink feedback configuration 400 and 401 may implement aspects of wireless communications systems 100 and 200. For example, sidelink feedback configuration 400 and 401 may include a base station 105-*c*, a UE 115-*e*, and a UE 115-*f*, which may represent examples of base stations 105 and UEs 115, respectively, as described with reference to FIGS. 1-3B. In some cases, sidelink feedback configuration 400 and 401 may represent a V2X system, where UE 115-*c* and UE 115-*d* represent vehicles. Additionally, base station 105-*c* may communicate with UE 115-*e* on resources of a carrier 405 using a Uu interface, and UE 115-*e* and UE 115-*f* may communicate with each other on resources of carrier using a PC5 interface (e.g., sidelink communications).

To enable the communications between UE 115-*e* and UE 115-*f* using the PC5 interface and connection, base station 105-*c* may schedule sidelink resource(s) to be used by UE 115-*e* for sidelink transmission(s). In some cases, base station 105-*c* may transmit an indication of the sidelink resource(s) to be used for the sidelink transmission(s) using dynamic grants, configured grants type 1, configured grants type 2, or a combination thereof. In some cases, base station 105-*c* may activate the configured grants type 1 via RRC signaling.

Additionally or alternatively, base station 105-*c* may transmit the dynamic grants and configured grants using a type 2 DCI format (e.g., DCI 30) over a downlink channel (e.g., carrier 405, a PDCCH, etc.). For example, the DCI may be a dynamic grant and may provide a one-time allocation to use over sidelink (e.g., carrier 410). For the dynamic grant, a CRC of the DCI carrying the dynamic grant may be scrambled by a sidelink RNTI (SL-RNTI). Additionally or alternatively, the DCI may activate or deactivate a configured grant type 2 for sidelink, where the CRC of the DCI carrying the configured grant type 2 is scrambled by a SL-CS-RNTI. In some cases, a UE 115 that receives the DCI carrying the configured grant type 2 may report an activation or deactivation confirmation using a MAC control element (MAC-CE). For example, if base station 105-*c* transmits a DCI to activate a configured grant type 2 to UE 115-*e* and UE 115-*e* successfully receives and decodes the DCI, UE 115-*e* may transmit a MAC-CE confirming receipt of the DCI and acknowledging that the configured grant type 2 is activated or deactivated. Additionally, the UE 115 may report a sidelink buffer status report (BSR) to base station 105-*c* using a MAC-CE. In some cases, the UE 115 may select a modulation and coding scheme (MCS) for the sidelink, where the selected MCS falls within limits set by base station 105-*c*.

As shown with reference to sidelink feedback configuration 401, base station 105-*c*, UE 115-*e*, and UE 115-*f* may follow physical-layer procedures for a configured type 2 activation (or deactivation) in V2X. Initially, base station 105-*c* may use a DCI format (e.g., DCI 30) to deliver a configured grant 415 (e.g., configured grant type 2) to a transmitter UE 115 (e.g., UE 115-*e*) to activate (or deactivate) sidelink resources. In some cases, DCI format 3_0 may be used for scheduling a physical sidelink control channel (PSCCH) and PSSCH in one cell. A CRC of the DCI format 3_0 may be scrambled by a SL-RNTI or a SL-CS-RNTI.

Additionally, the DCI format 3_0 may include a time gap, a HARQ process identifier, a new data indicator, a lowest index of a subchannel allocation to the initial transmission, first-stage SCI Format 0-1 fields (e.g., to indicate a frequency resource assignment, a time resource assignment, or both), a physical sidelink feedback channel (PSFCH)-to-HARQ feedback timing indicator, a physical uplink control channel (PUCCH) resource indicator, a configuration index, or a combination thereof.

Subsequently, the transmitter UE may confirm the activation (or deactivation) of the sidelink resources through a MAC-CE. After being activated, the transmitter UE 115 may use different SCI formats (e.g., SCI 0-1 and SCI 0-2) to schedule and transmit data through a PSSCH according to the configured grant 415 (e.g., configured grant type 2) on the sidelink resources to a receiver UE 115. For example, UE 115-e may transmit a sidelink transmission 420 to UE 115-f A first-stage SCI Format 0-1 may be used for scheduling PSSCH and a second-stage SCI on the PSSCH. The SCI format 0-1 may include a priority field (e.g., three (3) bits, a frequency resource assignment, a time resource assignment, a resource reservation period, a demodulation reference signal (DMRS) pattern, a second-stage SCI format (e.g., for broadcast, unicast, groupcast, etc.), a beta offset indicator, an indication of a number of DMRS port (e.g., one (1) bit, an MCS, one or more reserved bits (e.g., two (2) to four (4) bits as determined by a higher layer parameter (sl-NumReservedBits)), or a combination thereof. A second-stage SCI Format 0-2 may be used for decoding the PSSCH. The SCI format 0-2 may include a HARQ process identifier, a new data indicator (e.g., one (1) bit, an indication of a redundancy version (e.g., two (2) bits, a source identifier (e.g., eight (8) bits, a destination identifier (e.g., 16 bits), a channel state information (CSI) request (e.g., one (1) bit, or a combination thereof. Additionally, if the second-stage SCI format field in the corresponding SCI format 0-1 indicates a type 1 groupcast, the SCI format 0-2 may further include a zone identifier (e.g., 12 bits) and a communication range requirement (e.g., four (4) bits).

After receiving the sidelink transmission 420, the receiver UE 115 (e.g., UE 115-f) may send sidelink feedback 425 (e.g., acknowledgment feedback) on a PSFCH upon receiving each transmission according to the configured grant 415 (e.g., configured grant type 2). The transmitter UE 115 may then forward the sidelink feedback 425 in feedback 430 to base station 105-c on an uplink channel (e.g., PUCCH).

As described herein, rather than transmitting the SCIs using the different SCI formats prior to transmitting the sidelink transmission 420, base station 105-c may indicate an activation of sidelink SPS resources when transmitting the configured grant 415. Accordingly, UE 115-e may then transmit sidelink transmission 420 without a need for additional DCIs, grants, or SCIs. Additionally, base station 105-c may transmit a coupled (e.g., corresponding, related, etc.) configured grant to configured grant 415 to UE 115-f, such that UE 115-f may identify the sidelink SPS resources to know when and where to receive the sidelink transmission 420. Both UE 115-e and UE 115-f may transmit a MAC CE to acknowledge receipt of the respective configured grants and confirm the sidelink SPS resources are activated. Subsequently, if base station 105-c were to deactivate the sidelink SPS resources (e.g., sidelink communications between UE 115-e and UE 115-f are no longer needed, UE 115-e or UE 115-f is disabled or in need of repair, etc.), base station 105-c may transmit DCIs to both UE 115-e and UE 115-f to indicate deactivation of the sidelink SPS resources. Accordingly, UE 115-e and UE 115-f may again transmit a MAC CE to acknowledge receipt of the respective DCIs and confirm the sidelink SPS resources are deactivated.

Figure 5:
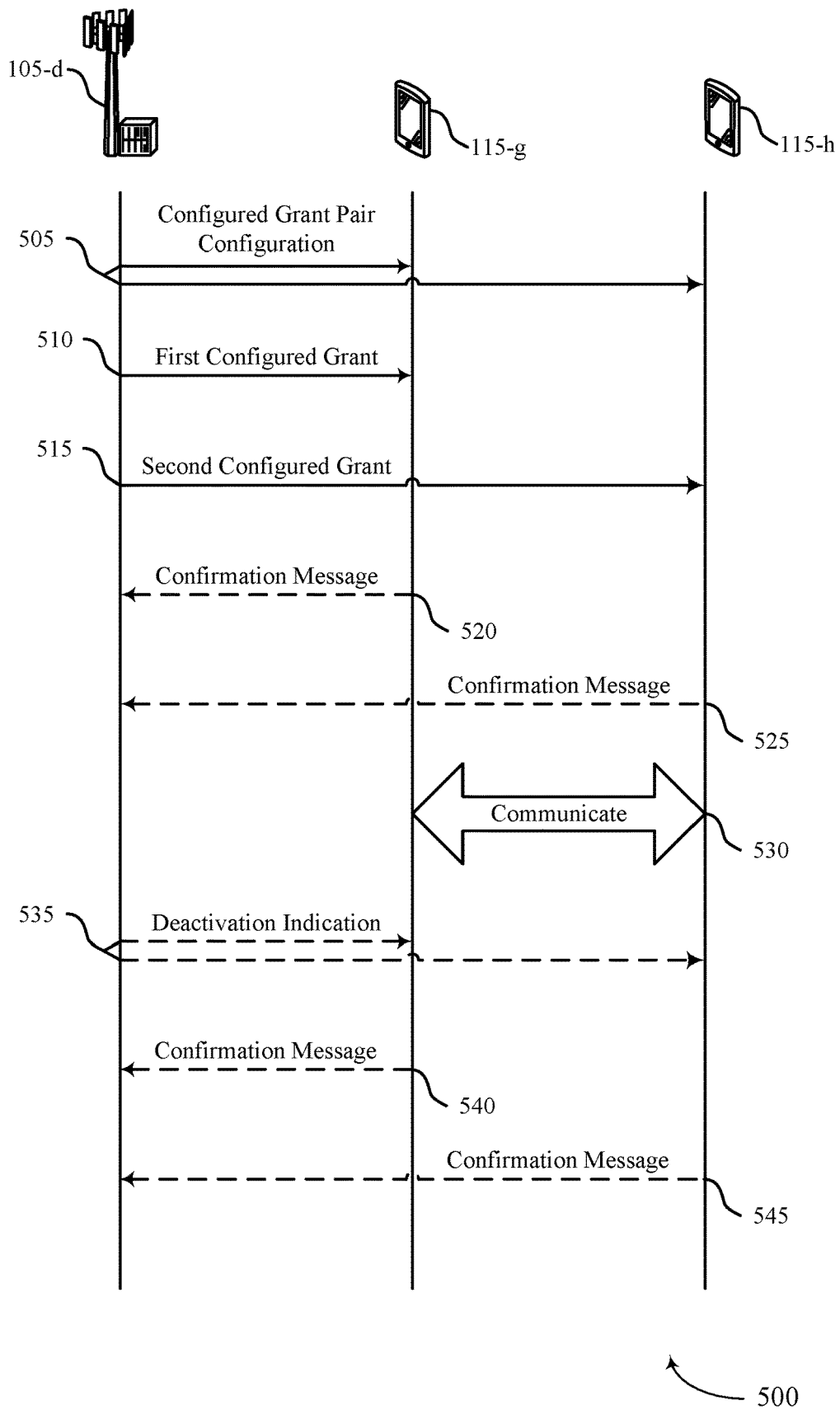
FIG. 5 illustrates an example of a process flow that supports SPS configurations for sidelink communications in accordance with aspects of the present disclosure.

FIG. 5 illustrates an example of a process flow 500 that supports SPS configurations for sidelink communications in accordance with aspects of the present disclosure. In some examples, process flow 500 may implement aspects of wireless communications systems 100 and 200. For example, process flow 500 may include a base station 105-d, a UE 115-g, and a UE 115-h, which may be examples of corresponding base stations 105 and UEs 115, respectively, as described with reference to FIGS. 1-4.

In the following description of the process flow 500, the operations between UE 115-g, UE 115-h, and base station 105-d may be transmitted in a different order than the order shown, or the operations performed by base station 105-d, UE 115-g, and UE 115-h may be performed in different orders or at different times. Some operations may also be left out of the process flow 500, or other operations may be added to the process flow 500. The base station 105-d, UE 115-g, and UE 115-h are shown performing a number of the operations of process flow 500, in some cases, any wireless device may perform the operations shown.

At 505, base station 105-d may transmit, to UE 115-g (e.g., a first UE) and UE 115-h (e.g., a second UE), a configured grant pair configuration indicating a sidelink SPS resource allocation for a sidelink channel. For example, UE 115-g may receive this configured grant pair configuration. In some cases, UE 115-g may receive, from base station 105-d, the configured grant pair configuration via a DCI message, RRC signaling, or a combination thereof.

At 510, base station 105-d may transmit, to UE 115-g, a first configured grant of a configured grant pair based on the configured grant pair configuration, where the first configured grant indicates activation of the sidelink SPS resource allocation for the sidelink channel. In some cases, UE 115-g may receive the first configured grant that indicates UE 115-g is a transmitter for communications with UE 115-h on the sidelink channel. For example, UE 115-g may receive the first configured grant including a bit set to indicate UE 115-g is the transmitter. Additionally or alternatively, UE 115-g may receive the first configured grant in a DCI format that indicates UE 115-g is the transmitter. In some cases, UE 115-g may receive the first configured grant including a CRC field scrambled with an RNTI that indicates UE 115-g is the transmitter (e.g., SL-CS-Tx-RNTI, SL-CS-RNTI, etc.).

At 515, base station 105-d may transmit, to UE 115-h, a second configured grant of the configured grant pair based on the configured grant pair configuration, where the second configured grant indicates the activation of the sidelink SPS resource allocation for the sidelink channel. In some cases, UE 115-h may receive the second configured grant that indicates UE 115-h is a receiver for communications with UE 115-g on the sidelink channel. For example, UE 115-h may receive the second configured grant including a bit set to indicate UE 115-h is the receiver. Additionally or alternatively, UE 115-h may receive the second configured grant in a DCI format that indicates UE 115-h is the receiver. In some cases, UE 115-h may receive the second configured grant including a CRC field scrambled with an RNTI that indicates UE 115-h is the receiver (e.g., SL-CS-Rx-RNTI, SL-CS-RNTI, etc.).

In some cases, when transmitting each of the configured grant pair, base station 105-d may transmit the first configured grant including a first CRC scrambled with a first RNTI corresponding to UE 115-g and an indication of UE 115-h and may transmit the second configured grant including a second CRC scrambled with a second RNTI corresponding to UE 115-*h* and an indication of UE 115-*g*. Additionally, base station 105-*d* may transmit, to UE 115-*g*, a first DCI message of coupled DCI messages including the first configured grant of the configured grant pair and may transmit, to UE 115-*h*, a second DCI message of the coupled DCI messages including the second configured grant of the configured grant pair. In some cases, base station 105-*d* may transmit an indication of a resource assignment for the sidelink SPS resource allocation (e.g., in each configured grant). Additionally, base station 105-*d* may transmit an indication for a retransmission on the sidelink channel according to the sidelink SPS resource allocation based on a first sidelink RNTI specific to UE 115-*g* used to scramble a first CRC of the first configured grant, a second sidelink RNTI specific to UE 115-*h* used to scramble a second CRC of the second configured grant, a new data indicator in each of the configured grant pair, a HARQ identifier field in each of the configured grant pair, or a combination thereof.

When receiving the first configured grant and the second configured grant, UE 115-*g* and UE 115-*h* may receive the first configured grant and the second configured grant, respectively, that include a new data indicator set to a first value and a resource assignment field set to a second value to indicate the activation of the sidelink SPS resource allocation. Additionally or alternatively, UE 115-*g* and UE 115-*h* may receive the first configured grant and the second configured grant, respectively, that include a field set to a first value to indicate the activation of the sidelink SPS resource allocation.

At 520, UE 115-*g* may transmit, to base station 105-*d*, a confirmation message to acknowledge the activation for the sidelink SPS resource allocation for the sidelink channel based on receiving the first configured grant. In some cases, UE 115-*g* may transmit a MAC CE including the confirmation message.

At 525, UE 115-*h* may transmit, to base station 105-*d*, a confirmation message to acknowledge the activation for the sidelink SPS resource allocation for the sidelink channel based on receiving the second configured grant. In some cases, UE 115-*h* may transmit a MAC CE including the confirmation message.

At 530, UE 115-*g* may communicate with UE 115-*h* on the sidelink channel according to the sidelink SPS resource allocation based on the first configured grant and the second configured grant. For example, UE 115-*g* may transmit a sidelink message to UE 115-*h* via the sidelink SPS resource allocation based on the first configured grant indicating that UE 115-*g* is the transmitter, and UE 115-*h* may receive the sidelink message from UE 115-*g* via the sidelink SPS resource allocation based on the second configured grant indicating that UE 115-*h* is the receiver.

At 535, base station 105-*d* may transmit, to UE 115-*g*, UE 115-*h*, or both, a DCI message that indicates to deactivate the sidelink SPS resource allocation for the sidelink channel.

At 540, UE 115-*g* may transmit, to base station 105-*d*, a confirmation message to acknowledge deactivation for the sidelink SPS resource allocation for the sidelink channel based on receiving the DCI message. In some cases, UE 115-*g* may transmit a MAC CE including the confirmation message.

At 545, UE 115-*h* may transmit, to base station 105-*d*, a confirmation message to acknowledge deactivation for the sidelink SPS resource allocation for the sidelink channel based on receiving the DCI message. In some cases, UE 115-*g* may transmit a MAC CE including the confirmation message.

Figure 6:
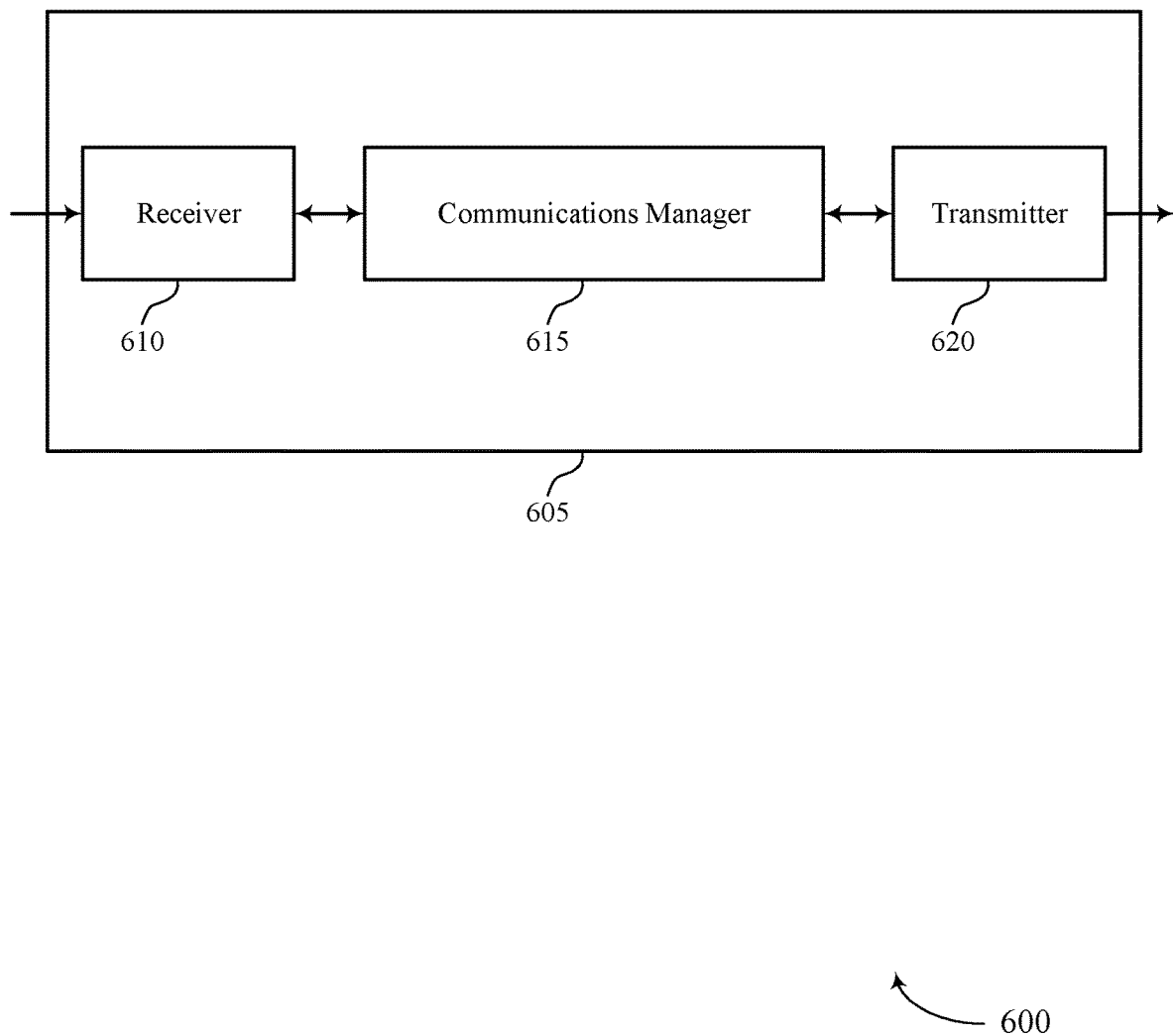
FIGS. 6 and 7 show block diagrams of devices that support SPS configurations for sidelink communications in accordance with aspects of the present disclosure.

FIG. 6 shows a block diagram 600 of a device 605 that supports SPS configurations for sidelink communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to SPS configurations for sidelink communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a configured grant pair configuration indicating a sidelink SPS resource allocation for a sidelink channel. Additionally, the communications manager 615 may receive, from the base station, a first configured grant of a configured grant pair based on the configured grant pair configuration, the first configured grant indicating an activation of the sidelink SPS resource allocation for the sidelink channel. In some cases, the communications manager 615 may communicate with a second UE on the sidelink channel according to the sidelink SPS resource allocation based on the first configured grant. The communications manager 615 may be an example of aspects of the communications manager 910 described herein.

In some examples, the UE communications manager 615 as described herein may be implemented to realize one or more potential advantages for a UE 115. For example, by using information included in a configured grant of a configured grant pair, the UE 115 may transmit sidelink messages to a second UE 115 without the need to transmit SCIs or other control information prior to transmitting the sidelink messages. As such, the UE 115 may reduce signaling overhead and reduce latency for the sidelink messages.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
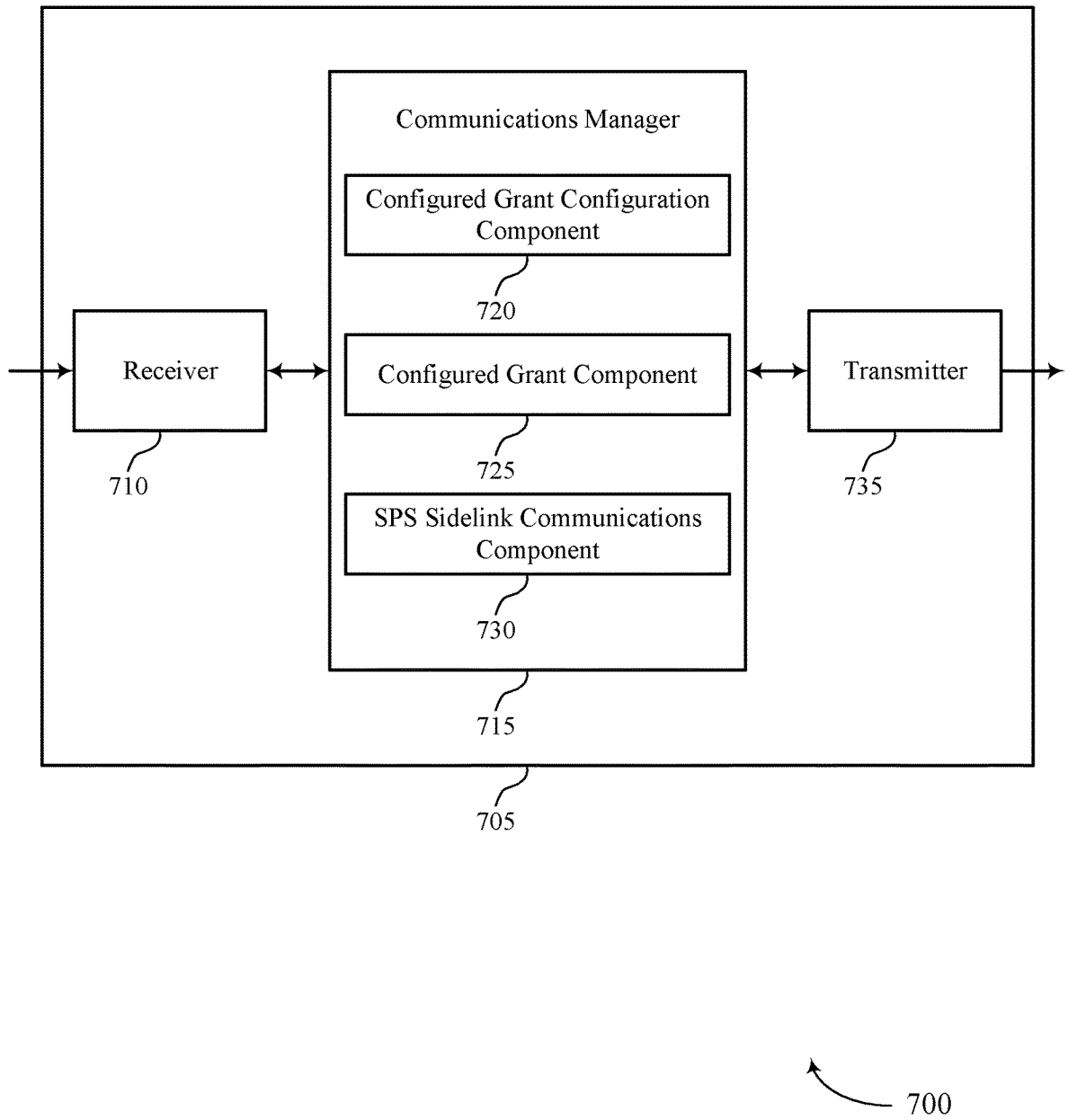

FIG. 7 shows a block diagram 700 of a device 705 that supports SPS configurations for sidelink communications in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to SPS configurations for sidelink communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a configured grant configuration component 720, a configured grant component 725, and a SPS sidelink communications component 730. The communications manager 715 may be an example of aspects of the communications manager 910 described herein.

The configured grant configuration component 720 may receive, from a base station, a configured grant pair configuration indicating a sidelink SPS resource allocation for a sidelink channel.

The configured grant component 725 may receive, from the base station, a first configured grant of a configured grant pair based on the configured grant pair configuration, the first configured grant indicating an activation of the sidelink SPS resource allocation for the sidelink channel.

The SPS sidelink communications component 730 may communicate with a second UE on the sidelink channel according to the sidelink SPS resource allocation based on the first configured grant.

Based on techniques for communicating with the second UE on the sidelink channel according to the sidelink SPS resource allocation based on configured grants, a processor of a UE 115 (e.g., controlling the receiver 710, the transmitter 735, or the transceiver 920 as described with reference to FIG. 9) may decrease latency and signaling overhead that would result from transmitting control messages with the second UE before being able to communicate on the sidelink channel. Additionally, the processor may of the UE 115 may reduce battery and power consumption by reducing the amount of signaling to prepare and process that may arise from the control message transmissions.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
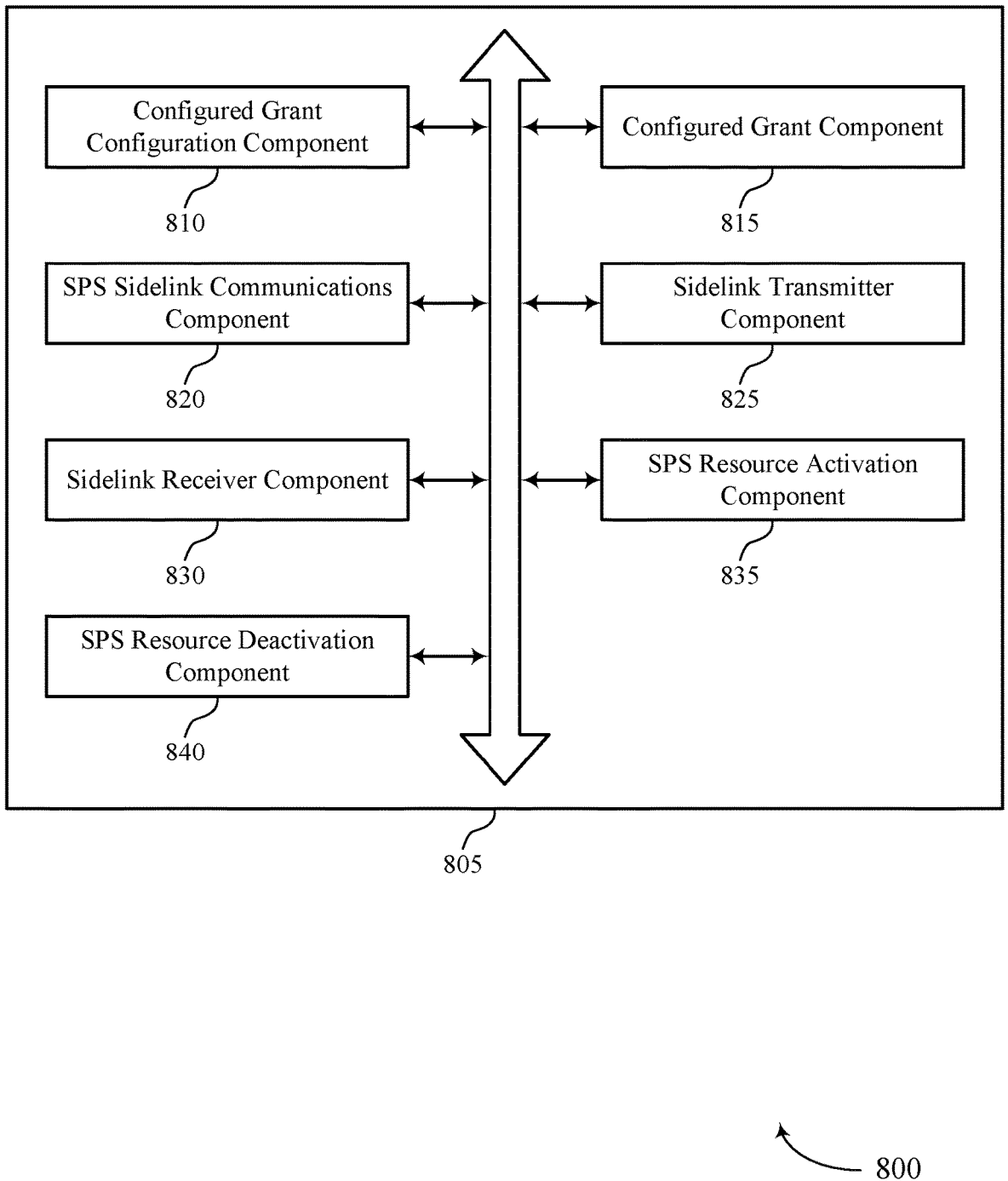
FIG. 8 shows a block diagram of a communications manager in accordance with aspects of the present disclosure.

FIG. 8 shows a block diagram 800 of a communications manager 805 that supports SPS configurations for sidelink communications in accordance with aspects of the present disclosure. The communications manager 805 may be an example of aspects of a communications manager 615, a communications manager 715, or a communications manager 910 described herein. The communications manager 805 may include a configured grant configuration component 810, a configured grant component 815, a SPS sidelink communications component 820, a sidelink transmitter component 825, a sidelink receiver component 830, a SPS resource activation component 835, and a SPS resource deactivation component 840. Each of these modules may communicate, directly or indirectly, with one another (e.g., via one or more buses).

The configured grant configuration component 810 may receive, from a base station, a configured grant pair configuration indicating a sidelink SPS resource allocation for a sidelink channel. In some examples, the configured grant configuration component 810 may receive, from the base station, the configured grant pair configuration via a DCI message, RRC signaling, or a combination thereof.

The configured grant component 815 may receive, from the base station, a first configured grant of a configured grant pair based on the configured grant pair configuration, the first configured grant indicating an activation of the sidelink SPS resource allocation for the sidelink channel. In some examples, the configured grant component 815 may receive the first configured grant including a cyclic redundancy check scrambled with a radio network temporary identifier corresponding to the UE and an indication of the second UE for communications on the sidelink channel. In some examples, the configured grant component 815 may receive an indication for a retransmission for communications on the sidelink channel according to the sidelink SPS resource allocation based on a sidelink radio network temporary identifier specific to the UE used to scramble a cyclic redundancy check of the first configured grant, a new data indicator, a hybrid access request identifier field in the first configured grant, or a combination thereof. In some examples, the configured grant component 815 may receive, from the base station, a downlink control information message including the first configured grant of the configured grant pair.

The SPS sidelink communications component 820 may communicate with a second UE on the sidelink channel according to the sidelink SPS resource allocation based on the first configured grant.

The sidelink transmitter component 825 may receive the first configured grant that indicates the UE is a transmitter for communications with the second UE on the sidelink channel. In some examples, the sidelink transmitter component 825 may transmit a sidelink message to the second UE via the sidelink SPS resource allocation based on the first configured grant indicating that the UE is the transmitter. In some examples, the sidelink transmitter component 825 may receive the first configured grant including a bit set to indicate the UE is the transmitter. In some examples, the sidelink transmitter component 825 may receive the first configured grant in a downlink control information format that indicates the UE is the transmitter. In some examples, the sidelink transmitter component 825 may receive the first configured grant including a cyclic redundancy check field scrambled with a radio network temporary identifier that indicates the UE is the transmitter.

The sidelink receiver component 830 may receive the first configured grant that indicates that the UE is a receiver for communications with the second UE on the sidelink channel. In some examples, the sidelink receiver component 830 may receive a sidelink message from the second UE via the sidelink SPS resource allocation based on the first configured grant indicating that the UE is the receiver. In some examples, the sidelink receiver component 830 may receive the first configured grant including a bit set to indicate the UE is the receiver. In some examples, the sidelink receiver component 830 may receive the first configured grant in a downlink control information format that indicates the UE is the receiver. In some examples, the sidelink receiver component 830 may receive the first configured grant including a cyclic redundancy check field scrambled with a radio network temporary identifier that indicates the UE is the receiver.

The SPS resource activation component 835 may receive the first configured grant including a new data indicator set to a first value and a resource assignment field set to a second value to indicate the activation of the sidelink SPS resource allocation. In some examples, the SPS resource activation component 835 may receive the first configured grant including a field set to a first value to indicate the activation of the sidelink SPS resource allocation. In some examples, the SPS resource activation component 835 may transmit, to the base station, a confirmation message to acknowledge the activation for the sidelink SPS resource allocation for the sidelink channel based on receiving the first configured grant. In some examples, the SPS resource activation component 835 may transmit a medium access control (MAC) control element including the confirmation message.

The SPS resource deactivation component 840 may receive, from the base station, a downlink control information message that indicates to deactivate the sidelink SPS resource allocation for the sidelink channel. In some examples, the SPS resource deactivation component 840 may transmit, to the base station, a confirmation message to acknowledge deactivation for the sidelink SPS resource allocation for the sidelink channel based on receiving the downlink control information message. In some examples, the SPS resource deactivation component 840 may transmit a medium access control (MAC) control element including the confirmation message.

Figure 9:
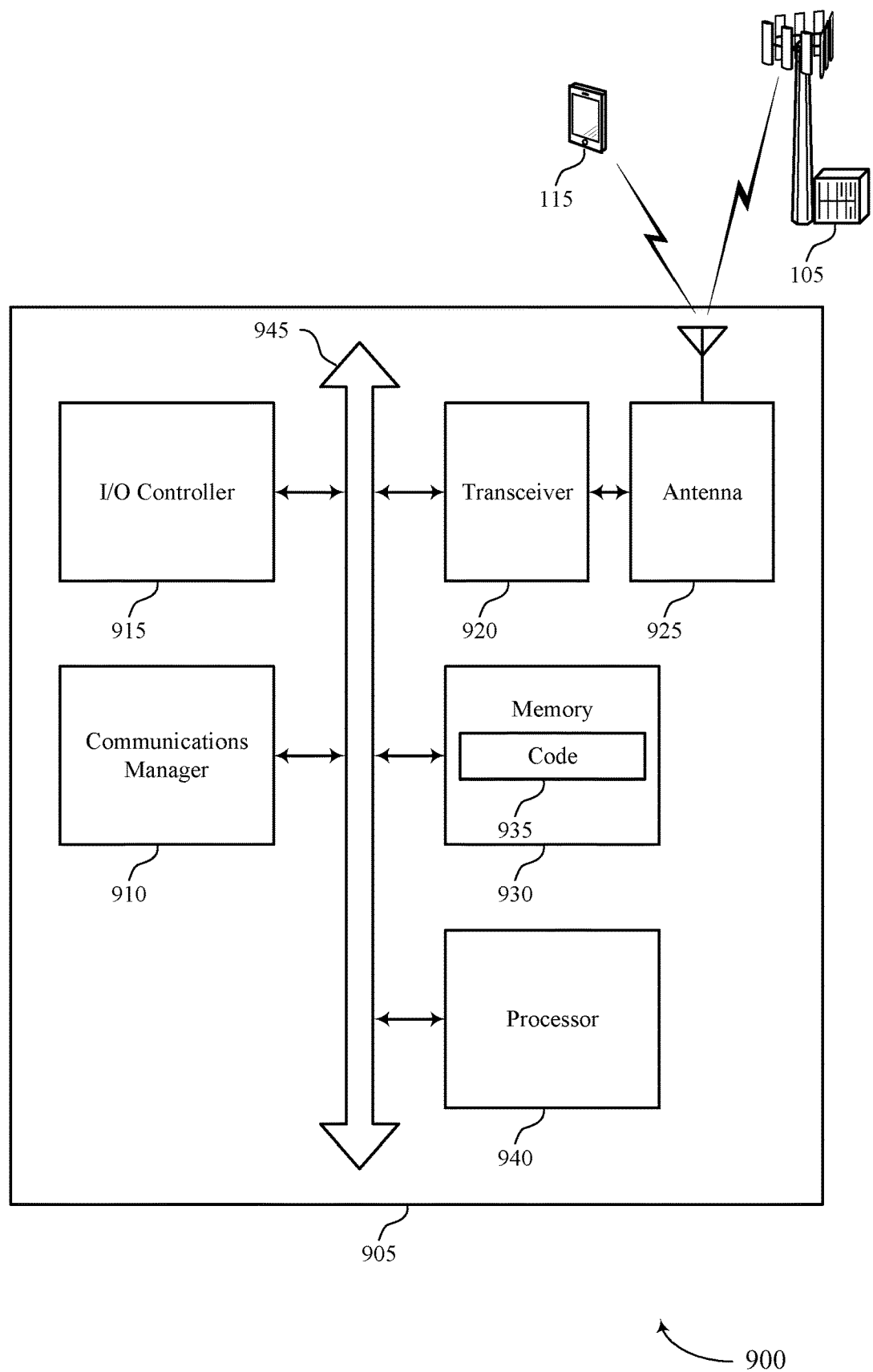
FIG. 9 shows a diagram of a system including a device that supports SPS configurations for sidelink communications in accordance with aspects of the present disclosure.

FIG. 9 shows a diagram of a system 900 including a device 905 that supports SPS configurations for sidelink communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a configured grant pair configuration indicating a sidelink SPS resource allocation for a sidelink channel. Additionally, the communications manager 910 may receive, from the base station, a first configured grant of a configured grant pair based on the configured grant pair configuration, the first configured grant indicating an activation of the sidelink SPS resource allocation for the sidelink channel. In some cases, the communications manager 910 may communicate with a second UE on the sidelink channel according to the sidelink SPS resource allocation based on the first configured grant.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting SPS configurations for sidelink communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
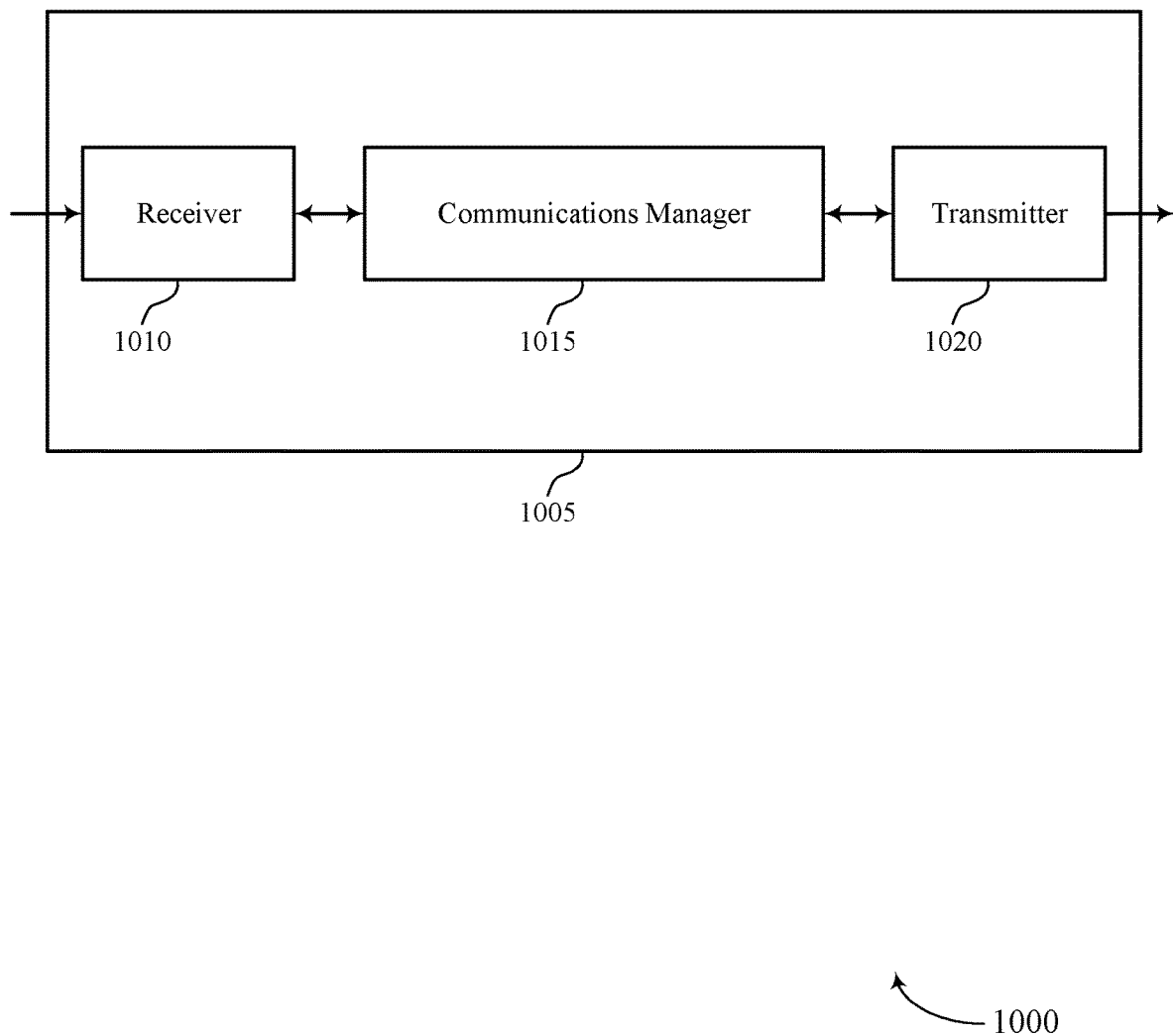
FIGS. 10 and 11 show block diagrams of devices that support SPS configurations for sidelink communications in accordance with aspects of the present disclosure.

FIG. 10 shows a block diagram 1000 of a device 1005 that supports SPS configurations for sidelink communications in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to SPS configurations for sidelink communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a first UE and a second UE, a configured grant pair configuration indicating a sidelink SPS resource allocation for a sidelink channel. In some cases, the communications manager 1015 may transmit, to the first UE, a first configured grant of a configured grant pair based on the configured grant pair configuration, the first configured grant indicating activation of the sidelink SPS resource allocation for the sidelink channel. Additionally, the communications manager 1015 may transmit, to the second UE, a second configured grant of the configured grant pair based on the configured grant pair configuration, the second configured grant indicating the activation of the sidelink SPS resource allocation for the sidelink channel. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
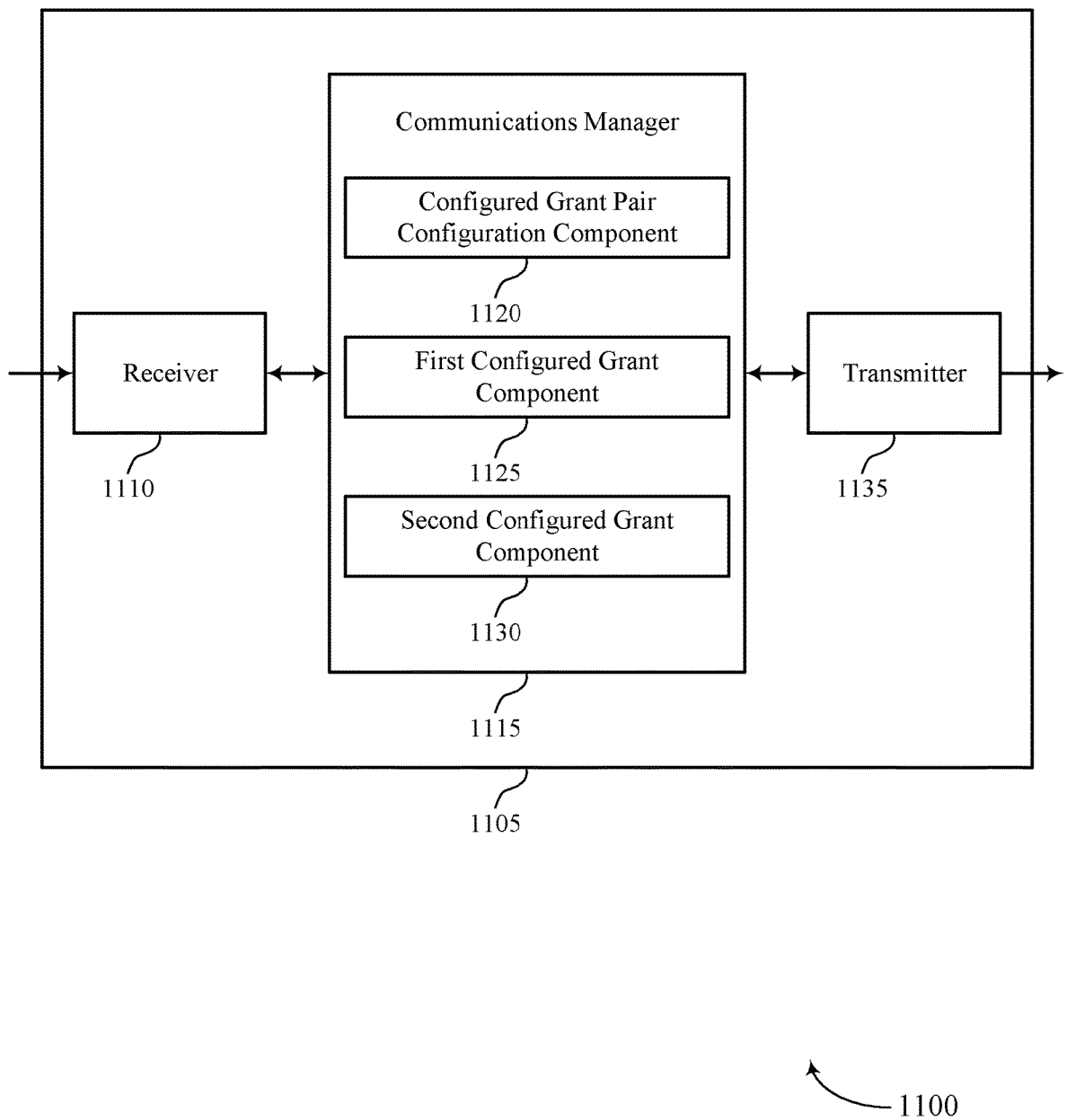

FIG. 11 shows a block diagram 1100 of a device 1105 that supports SPS configurations for sidelink communications in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to SPS configurations for sidelink communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configured grant pair configuration component 1120, a first configured grant component 1125, and a second configured grant component 1130. The communications manager 1115 may be an example of aspects of the communications manager 1310 described herein.

The configured grant pair configuration component 1120 may transmit, to a first UE and a second UE, a configured grant pair configuration indicating a sidelink SPS resource allocation for a sidelink channel.

The first configured grant component 1125 may transmit, to the first UE, a first configured grant of a configured grant pair based on the configured grant pair configuration, the first configured grant indicating activation of the sidelink SPS resource allocation for the sidelink channel.

The second configured grant component 1130 may transmit, to the second UE, a second configured grant of the configured grant pair based on the configured grant pair configuration, the second configured grant indicating the activation of the sidelink SPS resource allocation for the sidelink channel.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
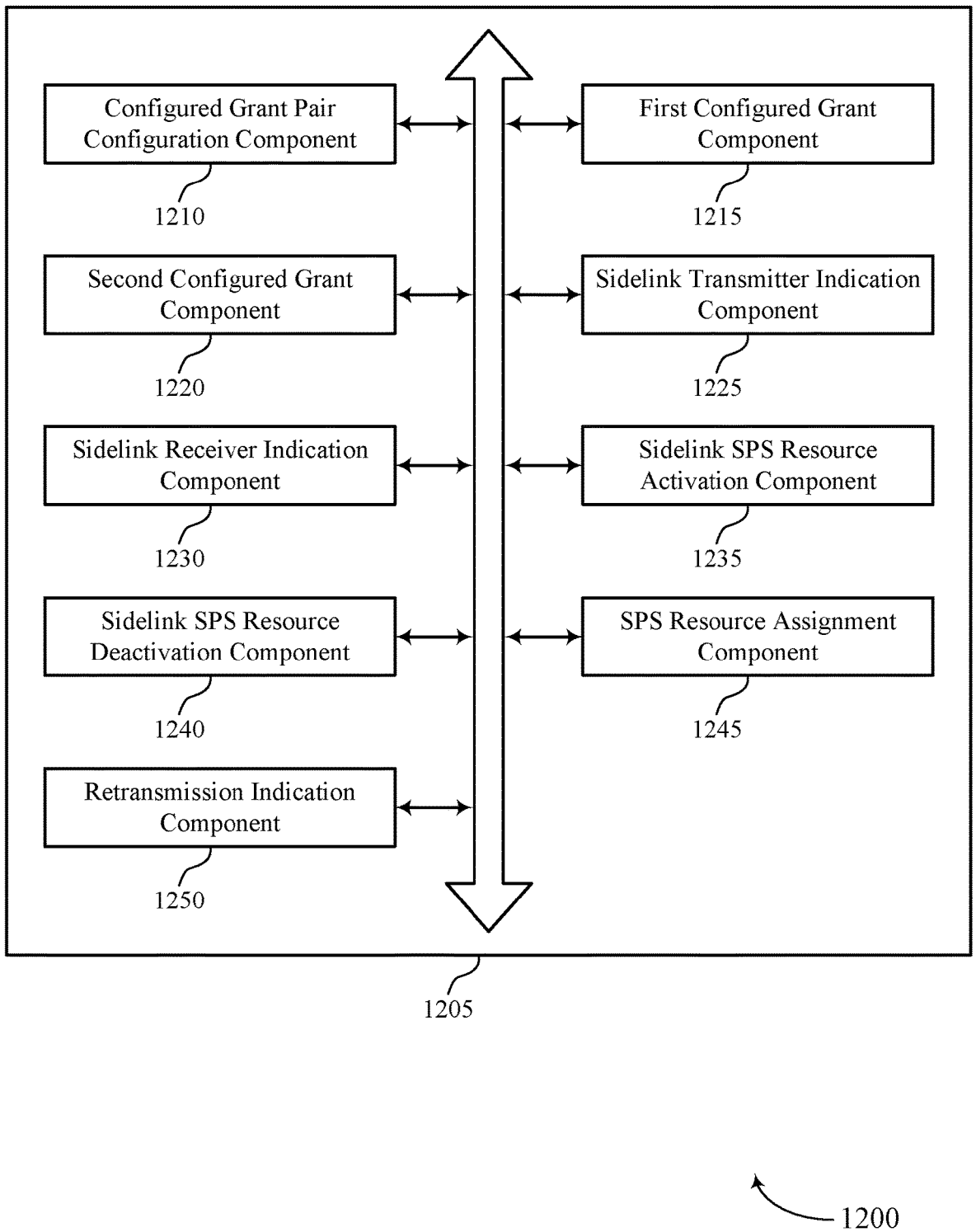
FIG. 12 shows a block diagram of a communications manager that supports SPS configurations for sidelink communications in accordance with aspects of the present disclosure.

FIG. 12 shows a block diagram 1200 of a communications manager 1205 that supports SPS configurations for sidelink communications in accordance with aspects of the present disclosure. The communications manager 1205 may be an example of aspects of a communications manager 1015, a communications manager 1115, or a communications manager 1310 described herein. The communications manager 1205 may include a configured grant pair configuration component 1210, a first configured grant component 1215, a second configured grant component 1220, a sidelink transmitter indication component 1225, a sidelink receiver indication component 1230, a sidelink SPS resource activation component 1235, a sidelink SPS resource deactivation component 1240, a SPS resource assignment component 1245, and a retransmission indication component 1250. Each of these modules may communicate, directly or indirectly, with one another (e.g., via one or more buses).

The configured grant pair configuration component 1210 may transmit, to a first UE and a second UE, a configured grant pair configuration indicating a sidelink SPS resource allocation for a sidelink channel. In some examples, the configured grant pair configuration component 1210 may transmit, to the first UE, the second UE, or both, the configured grant pair configuration via a downlink control information message, radio resource control signaling, or a combination thereof.

The first configured grant component 1215 may transmit, to the first UE, a first configured grant of a configured grant pair based on the configured grant pair configuration, the first configured grant indicating activation of the sidelink SPS resource allocation for the sidelink channel. In some examples, the first configured grant component 1215 may transmit the first configured grant including a first cyclic redundancy check scrambled with a first radio network temporary identifier corresponding to the first UE and an indication of the second UE. In some examples, the first configured grant component 1215 may transmit, to the first UE, a first downlink control information message of coupled downlink control information messages including the first configured grant of the configured grant pair.

The second configured grant component 1220 may transmit, to the second UE, a second configured grant of the configured grant pair based on the configured grant pair configuration, the second configured grant indicating the activation of the sidelink SPS resource allocation for the sidelink channel. In some examples, the second configured grant component 1220 may transmit the second configured grant including a second cyclic redundancy check scrambled with a second radio network temporary identifier corresponding to the second UE and an indication of the first UE. In some examples, the second configured grant component 1220 may transmit, to the second UE, a second downlink control information message of the coupled downlink control information messages including the second configured grant of the configured grant pair.

The sidelink transmitter indication component 1225 may transmit, to the first UE, the first configured grant indicating that the first UE is a transmitter for communications with the second UE on the sidelink channel. In some examples, the sidelink transmitter indication component 1225 may transmit the first configured grant including a bit to indicate the first UE is the transmitter. In some examples, the sidelink transmitter indication component 1225 may transmit the first configured grant in a downlink control information format that indicates the UE is the transmitter. In some examples, the sidelink transmitter indication component 1225 may transmit the first configured grant including a cyclic redundancy check field scrambled with a radio network temporary identifier that indicates the UE is the transmitter.

The sidelink receiver indication component 1230 may transmit, to the second UE, the second configured grant indicating that the second UE is a receiver for communications with the first UE on the sidelink channel. In some examples, the sidelink receiver indication component 1230 may transmit the second configured grant including a bit set to indicate the second UE is the receiver. In some examples, the sidelink receiver indication component 1230 may transmit the second configured grant in a downlink control information format that indicates the second UE is the receiver. In some examples, the sidelink receiver indication component 1230 may transmit the second configured grant including a cyclic redundancy check field scrambled with a radio network temporary identifier that indicates the second UE is the receiver.

The sidelink SPS resource activation component 1235 may transmit the first configured grant and the second configured grant that each include a new data indicator set to a first value and a resource assignment field set to a second value to indicate the activation of the sidelink SPS resource allocation. In some examples, the sidelink SPS resource activation component 1235 may transmit the first configured grant and the second configured grant that each include a field set to a first value to indicate the activation of the sidelink SPS resource allocation. In some examples, the sidelink SPS resource activation component 1235 may receive, from the first UE, the second UE, or both, a confirmation message to acknowledge the activation for the sidelink SPS resource allocation for the sidelink channel. In some examples, the sidelink SPS resource activation component 1235 may receive a medium access control (MAC) control element including the confirmation message.

The sidelink SPS resource deactivation component 1240 may transmit, to the first UE, the second UE, or both, a downlink control information message that indicates to deactivate the sidelink SPS resource allocation for the sidelink channel. In some examples, the sidelink SPS resource deactivation component 1240 may receive, from the first UE, the second UE, or both, a confirmation message to acknowledge deactivation for the sidelink SPS resource allocation for the sidelink channel based on transmitting the downlink control information message. In some examples, the sidelink SPS resource deactivation component 1240 may receive a medium access control (MAC) control element including the confirmation message.

The SPS resource assignment component 1245 may transmit an indication of a resource assignment for the sidelink SPS resource allocation.

The retransmission indication component 1250 may transmit an indication for a retransmission on the sidelink channel according to the sidelink SPS resource allocation based on a first sidelink radio network temporary identifier specific to the first UE used to scramble a first cyclic redundancy check of the first configured grant, a second sidelink radio network temporary identifier specific to the second UE used to scramble a second cyclic redundancy check of the second configured grant, a new data indicator in each of the configured grant pair, a hybrid access request identifier field in each of the configured grant pair, or a combination thereof.

Figure 13:
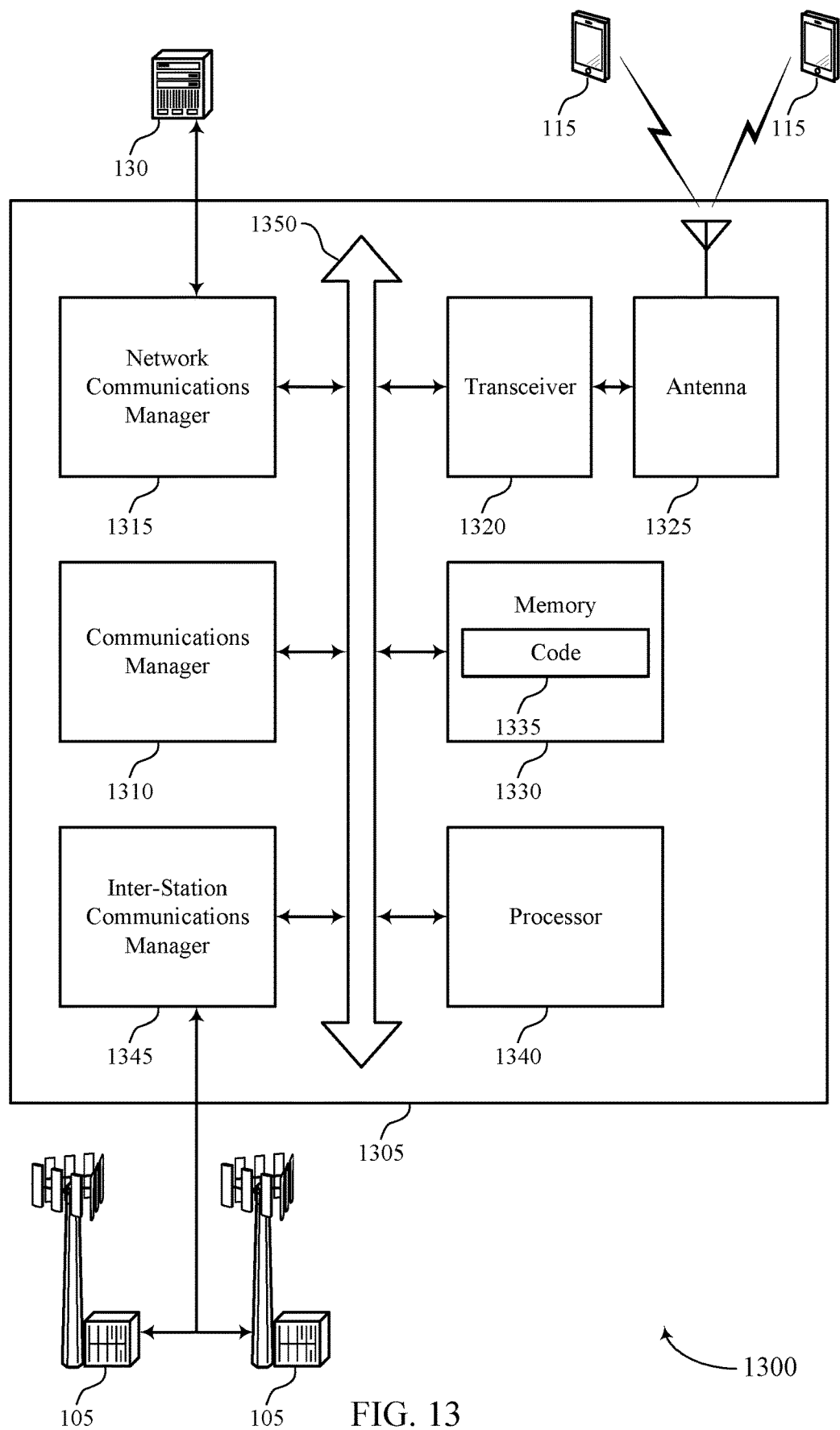
FIG. 13 shows a diagram of a system including a device that supports SPS configurations for sidelink communications in accordance with aspects of the present disclosure.

FIG. 13 shows a diagram of a system 1300 including a device 1305 that supports SPS configurations for sidelink communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a first UE and a second UE, a configured grant pair configuration indicating a sidelink SPS resource allocation for a sidelink channel. In some cases, the communications manager 1310 may transmit, to the first UE, a first configured grant of a configured grant pair based on the configured grant pair configuration, the first configured grant indicating activation of the sidelink SPS resource allocation for the sidelink channel. Additionally, the communications manager 1310 may transmit, to the second UE, a second configured grant of the configured grant pair based on the configured grant pair configuration, the second configured grant indicating the activation of the sidelink SPS resource allocation for the sidelink channel.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting SPS configurations for sidelink communications).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
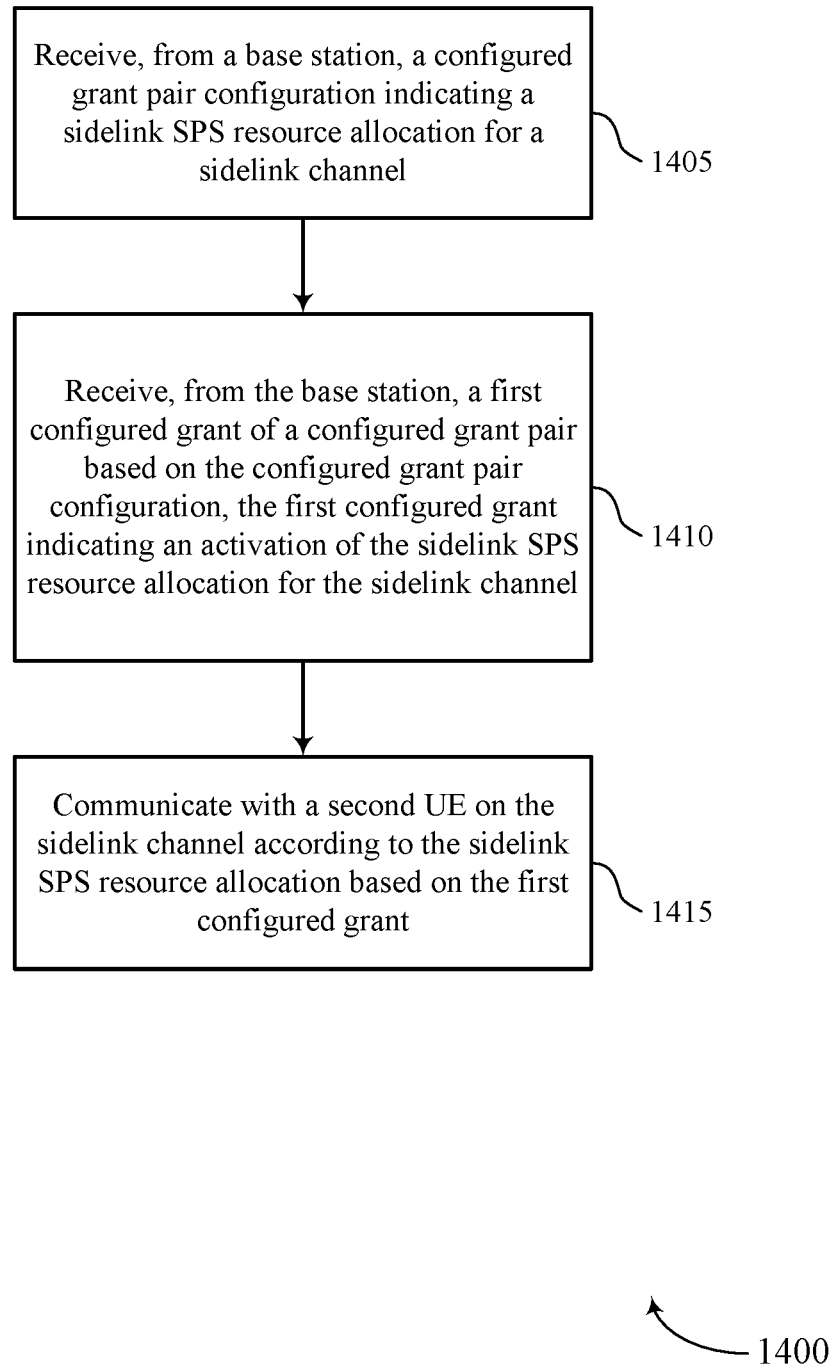
FIGS. 14 through 21 show flowcharts illustrating methods that support SPS configurations for sidelink communications in accordance with aspects of the present disclosure.

FIG. 14 shows a flowchart illustrating a method 1400 that supports SPS configurations for sidelink communications in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a configured grant pair configuration indicating a sidelink SPS resource allocation for a sidelink channel. The operations of 1405 may be performed according to the methods described herein. In some examples, aspects of the operations of 1405 may be performed by a configured grant configuration component as described with reference to FIGS. 6 through 9.

At 1410, the UE may receive, from the base station, a first configured grant of a configured grant pair based on the configured grant pair configuration, the first configured grant indicating an activation of the sidelink SPS resource allocation for the sidelink channel. The operations of 1410 may be performed according to the methods described herein. In some examples, aspects of the operations of 1410 may be performed by a configured grant component as described with reference to FIGS. 6 through 9.

At 1415, the UE may communicate with a second UE on the sidelink channel according to the sidelink SPS resource allocation based on the first configured grant. The operations of 1415 may be performed according to the methods described herein. In some examples, aspects of the operations of 1415 may be performed by a SPS sidelink communications component as described with reference to FIGS. 6 through 9.

Figure 15:
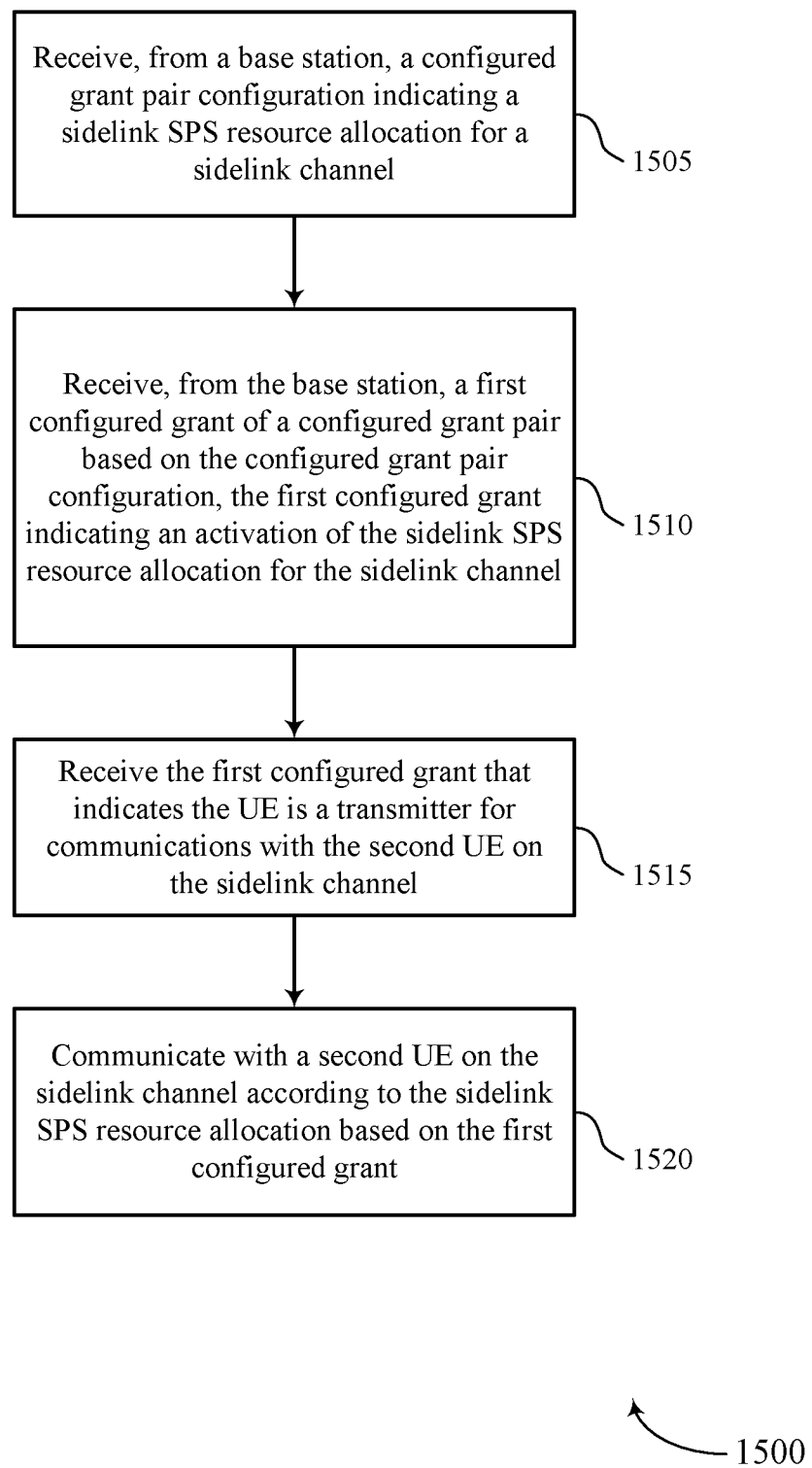

FIG. 15 shows a flowchart illustrating a method 1500 that supports SPS configurations for sidelink communications in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a configured grant pair configuration indicating a sidelink SPS resource allocation for a sidelink channel. The operations of 1505 may be performed according to the methods described herein. In some examples, aspects of the operations of 1505 may be performed by a configured grant configuration component as described with reference to FIGS. 6 through 9.

At 1510, the UE may receive, from the base station, a first configured grant of a configured grant pair based on the configured grant pair configuration, the first configured grant indicating an activation of the sidelink SPS resource allocation for the sidelink channel. The operations of 1510 may be performed according to the methods described herein. In some examples, aspects of the operations of 1510 may be performed by a configured grant component as described with reference to FIGS. 6 through 9.

At 1515, the UE may receive the first configured grant that indicates the UE is a transmitter for communications with the second UE on the sidelink channel. The operations of 1515 may be performed according to the methods described herein. In some examples, aspects of the operations of 1515 may be performed by a sidelink transmitter component as described with reference to FIGS. 6 through 9.

At 1520, the UE may communicate with a second UE on the sidelink channel according to the sidelink SPS resource allocation based on the first configured grant. The operations of 1520 may be performed according to the methods described herein. In some examples, aspects of the operations of 1520 may be performed by a SPS sidelink communications component as described with reference to FIGS. 6 through 9.

Figure 16:
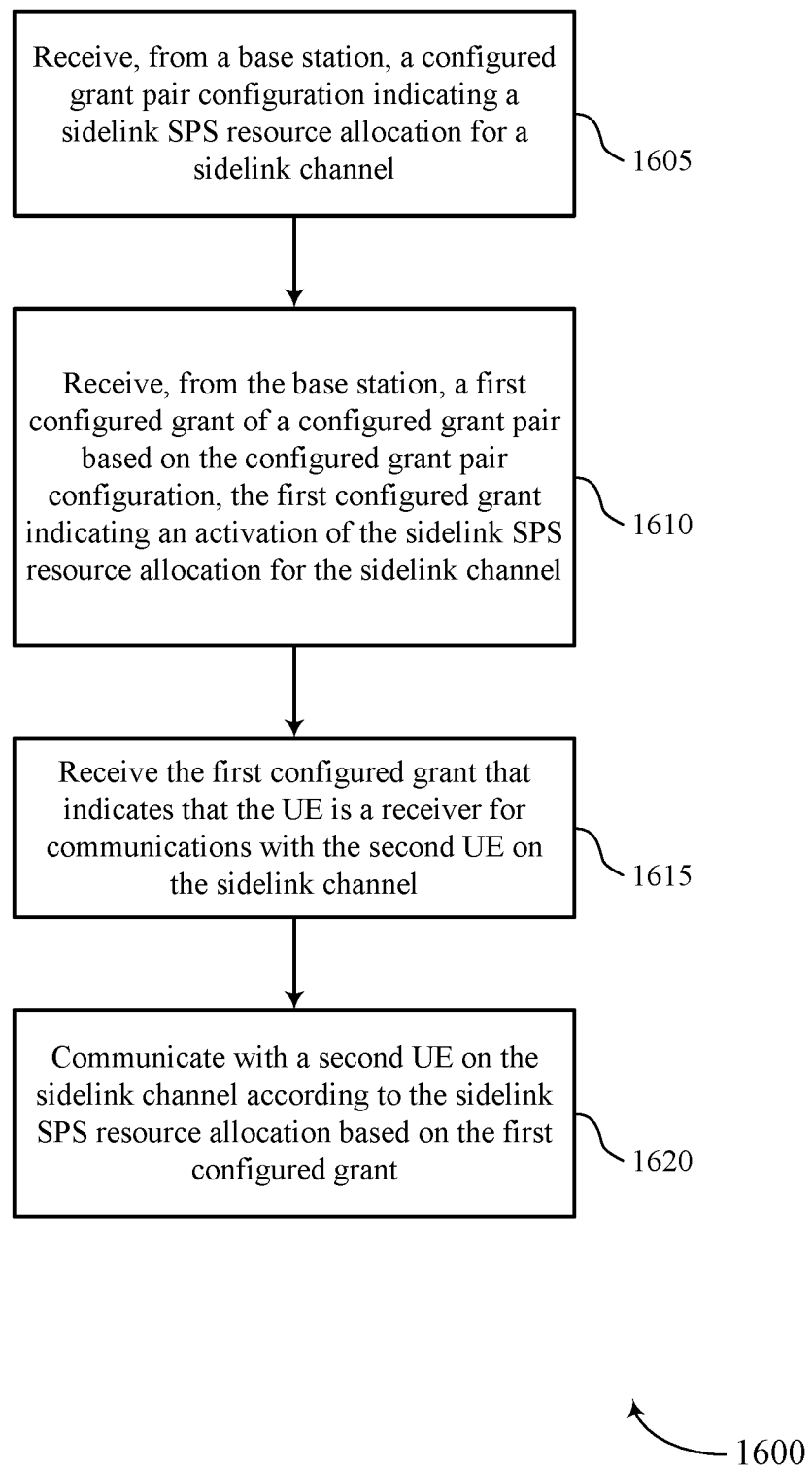

FIG. 16 shows a flowchart illustrating a method 1600 that supports SPS configurations for sidelink communications in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a configured grant pair configuration indicating a sidelink SPS resource allocation for a sidelink channel. The operations of 1605 may be performed according to the methods described herein. In some examples, aspects of the operations of 1605 may be performed by a configured grant configuration component as described with reference to FIGS. 6 through 9.

At 1610, the UE may receive, from the base station, a first configured grant of a configured grant pair based on the configured grant pair configuration, the first configured grant indicating an activation of the sidelink SPS resource allocation for the sidelink channel. The operations of 1610 may be performed according to the methods described herein. In some examples, aspects of the operations of 1610 may be performed by a configured grant component as described with reference to FIGS. 6 through 9.

At 1615, the UE may receive the first configured grant that indicates that the UE is a receiver for communications with the second UE on the sidelink channel. The operations of 1615 may be performed according to the methods described herein. In some examples, aspects of the operations of 1615 may be performed by a sidelink receiver component as described with reference to FIGS. 6 through 9.

At 1620, the UE may communicate with a second UE on the sidelink channel according to the sidelink SPS resource allocation based on the first configured grant. The operations of 1620 may be performed according to the methods described herein. In some examples, aspects of the operations of 1620 may be performed by a SPS sidelink communications component as described with reference to FIGS. 6 through 9.

Figure 17:
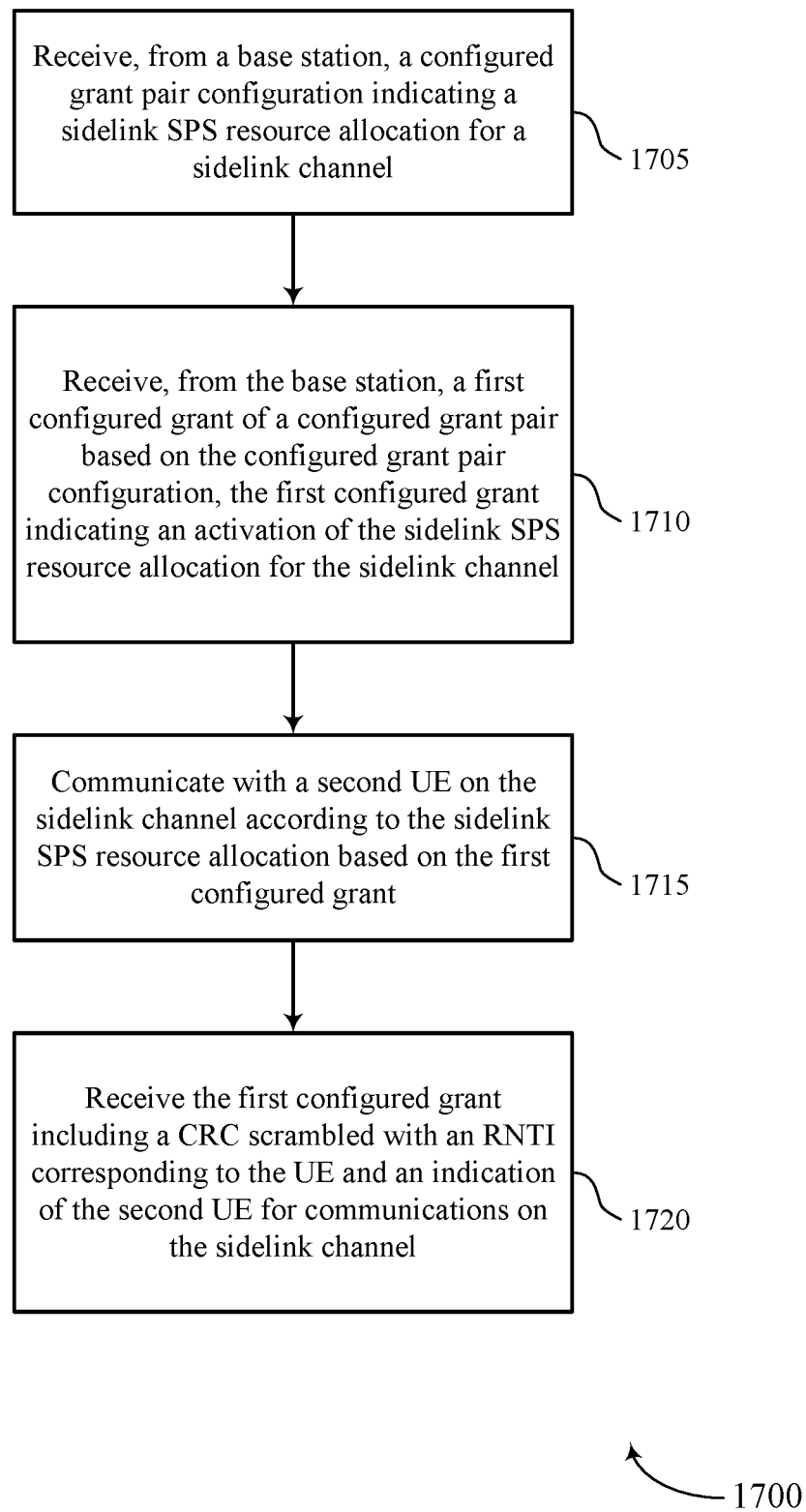

FIG. 17 shows a flowchart illustrating a method 1700 that supports SPS configurations for sidelink communications in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a configured grant pair configuration indicating a sidelink SPS resource allocation for a sidelink channel. The operations of 1705 may be performed according to the methods described herein. In some examples, aspects of the operations of 1705 may be performed by a configured grant configuration component as described with reference to FIGS. 6 through 9.

At 1710, the UE may receive, from the base station, a first configured grant of a configured grant pair based on the configured grant pair configuration, the first configured grant indicating an activation of the sidelink SPS resource allocation for the sidelink channel. The operations of 1710 may be performed according to the methods described herein. In some examples, aspects of the operations of 1710 may be performed by a configured grant component as described with reference to FIGS. 6 through 9.

At 1715, the UE may communicate with a second UE on the sidelink channel according to the sidelink SPS resource allocation based on the first configured grant. The operations of 1715 may be performed according to the methods described herein. In some examples, aspects of the operations of 1715 may be performed by a SPS sidelink communications component as described with reference to FIGS. 6 through 9.

At 1720, the UE may receive the first configured grant including a cyclic redundancy check scrambled with a radio network temporary identifier corresponding to the UE and an indication of the second UE for communications on the sidelink channel. The operations of 1720 may be performed according to the methods described herein. In some examples, aspects of the operations of 1720 may be performed by a configured grant component as described with reference to FIGS. 6 through 9.

Figure 18:
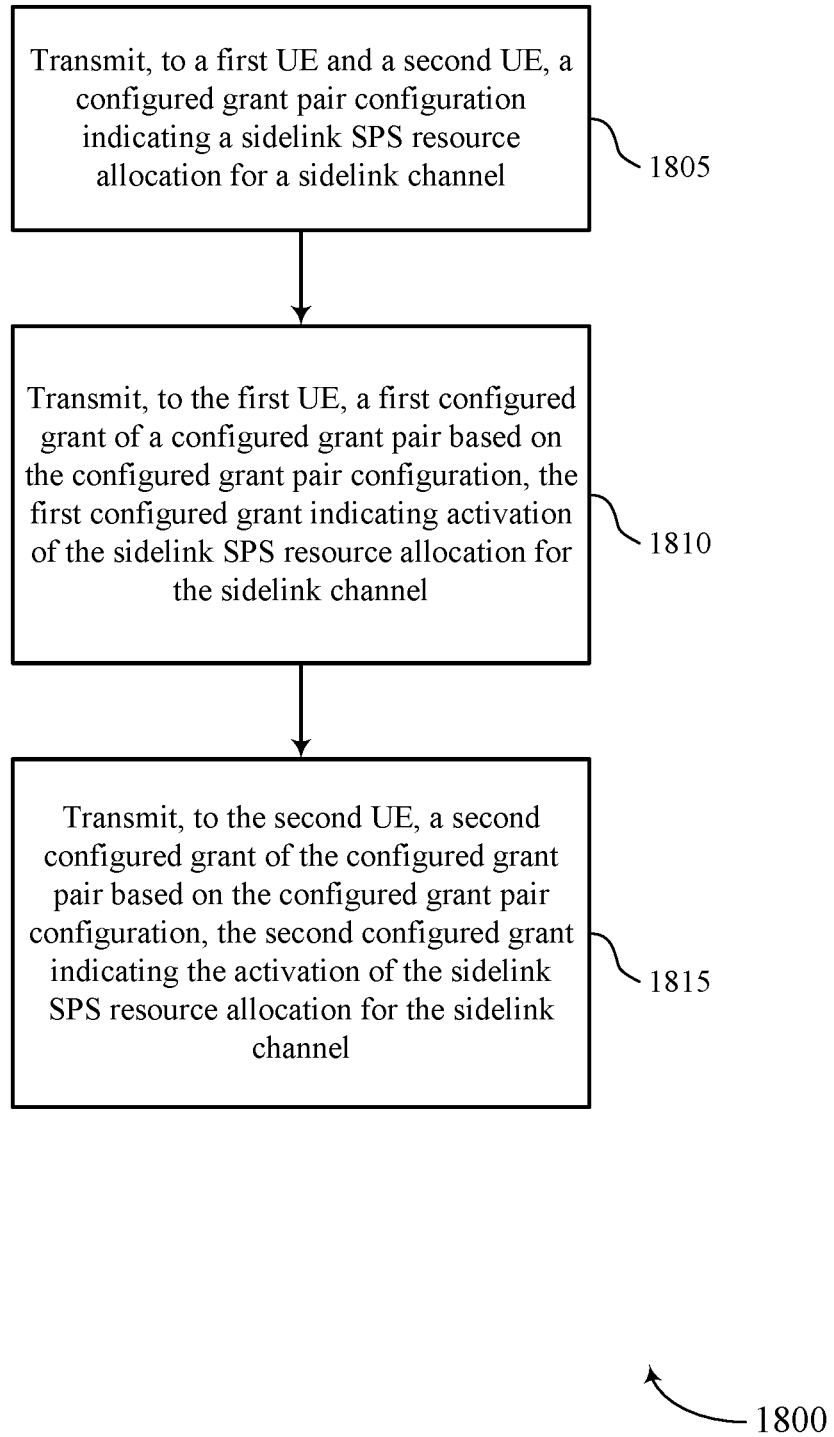

FIG. 18 shows a flowchart illustrating a method 1800 that supports SPS configurations for sidelink communications in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, to a first UE and a second UE, a configured grant pair configuration indicating a sidelink SPS resource allocation for a sidelink channel. The operations of 1805 may be performed according to the methods described herein. In some examples, aspects of the operations of 1805 may be performed by a configured grant pair configuration component as described with reference to FIGS. 10 through 13.

At 1810, the base station may transmit, to the first UE, a first configured grant of a configured grant pair based on the configured grant pair configuration, the first configured grant indicating activation of the sidelink SPS resource allocation for the sidelink channel. The operations of 1810 may be performed according to the methods described herein. In some examples, aspects of the operations of 1810 may be performed by a first configured grant component as described with reference to FIGS. 10 through 13.

At 1815, the base station may transmit, to the second UE, a second configured grant of the configured grant pair based on the configured grant pair configuration, the second configured grant indicating the activation of the sidelink SPS resource allocation for the sidelink channel. The operations of 1815 may be performed according to the methods described herein. In some examples, aspects of the operations of 1815 may be performed by a second configured grant component as described with reference to FIGS. 10 through 13.

Figure 19:
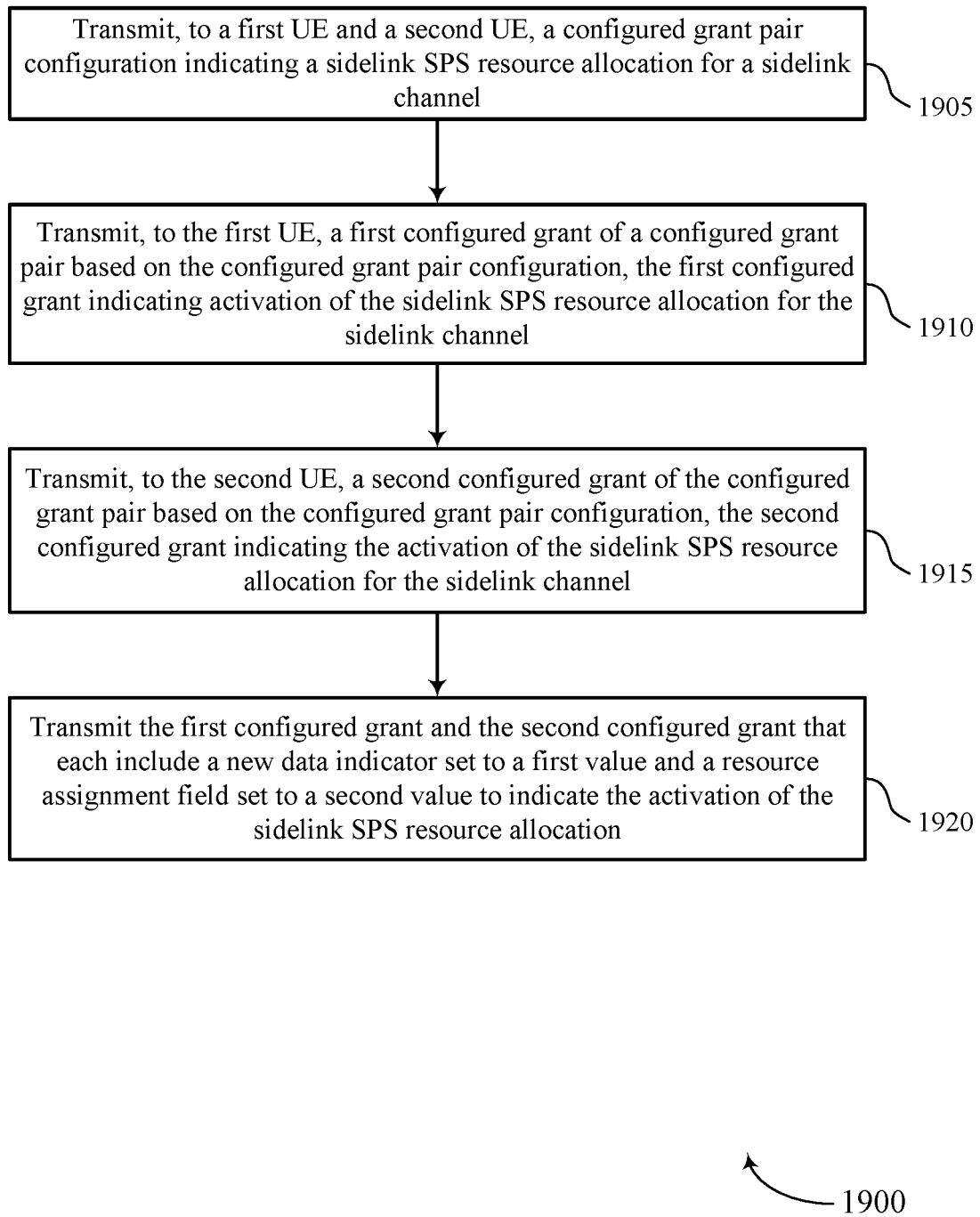

FIG. 19 shows a flowchart illustrating a method 1900 that supports SPS configurations for sidelink communications in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may transmit, to a first UE and a second UE, a configured grant pair configuration indicating a sidelink SPS resource allocation for a sidelink channel. The operations of 1905 may be performed according to the methods described herein. In some examples, aspects of the operations of 1905 may be performed by a configured grant pair configuration component as described with reference to FIGS. 10 through 13.

At 1910, the base station may transmit, to the first UE, a first configured grant of a configured grant pair based on the configured grant pair configuration, the first configured grant indicating activation of the sidelink SPS resource allocation for the sidelink channel. The operations of 1910 may be performed according to the methods described herein. In some examples, aspects of the operations of 1910 may be performed by a first configured grant component as described with reference to FIGS. 10 through 13.

At 1915, the base station may transmit, to the second UE, a second configured grant of the configured grant pair based on the configured grant pair configuration, the second configured grant indicating the activation of the sidelink SPS resource allocation for the sidelink channel. The operations of 1915 may be performed according to the methods described herein. In some examples, aspects of the operations of 1915 may be performed by a second configured grant component as described with reference to FIGS. 10 through 13.

At 1920, the base station may transmit the first configured grant and the second configured grant that each include a new data indicator set to a first value and a resource assignment field set to a second value to indicate the activation of the sidelink SPS resource allocation. The operations of 1920 may be performed according to the methods described herein. In some examples, aspects of the operations of 1920 may be performed by a sidelink SPS resource activation component as described with reference to FIGS. 10 through 13.

Figure 20:
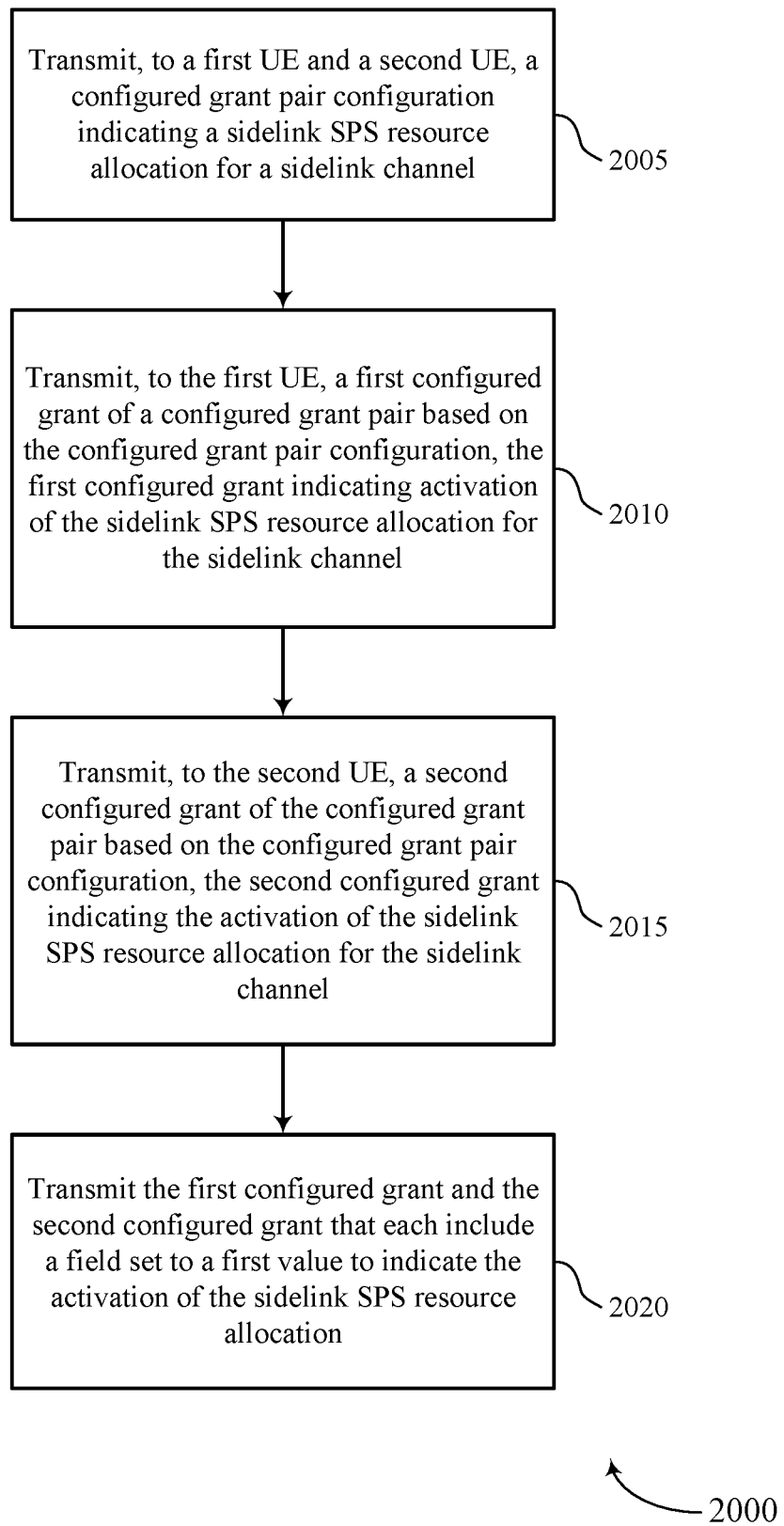

FIG. 20 shows a flowchart illustrating a method 2000 that supports SPS configurations for sidelink communications in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may transmit, to a first UE and a second UE, a configured grant pair configuration indicating a sidelink SPS resource allocation for a sidelink channel. The operations of 2005 may be performed according to the methods described herein. In some examples, aspects of the operations of 2005 may be performed by a configured grant pair configuration component as described with reference to FIGS. 10 through 13.

At 2010, the base station may transmit, to the first UE, a first configured grant of a configured grant pair based on the configured grant pair configuration, the first configured grant indicating activation of the sidelink SPS resource allocation for the sidelink channel. The operations of 2010 may be performed according to the methods described herein. In some examples, aspects of the operations of 2010 may be performed by a first configured grant component as described with reference to FIGS. 10 through 13.

At 2015, the base station may transmit, to the second UE, a second configured grant of the configured grant pair based on the configured grant pair configuration, the second configured grant indicating the activation of the sidelink SPS resource allocation for the sidelink channel. The operations of 2015 may be performed according to the methods described herein. In some examples, aspects of the operations of 2015 may be performed by a second configured grant component as described with reference to FIGS. 10 through 13.

At 2020, the base station may transmit the first configured grant and the second configured grant that each include a field set to a first value to indicate the activation of the sidelink SPS resource allocation. The operations of 2020 may be performed according to the methods described herein. In some examples, aspects of the operations of 2020 may be performed by a sidelink SPS resource activation component as described with reference to FIGS. 10 through 13.

Figure 21:
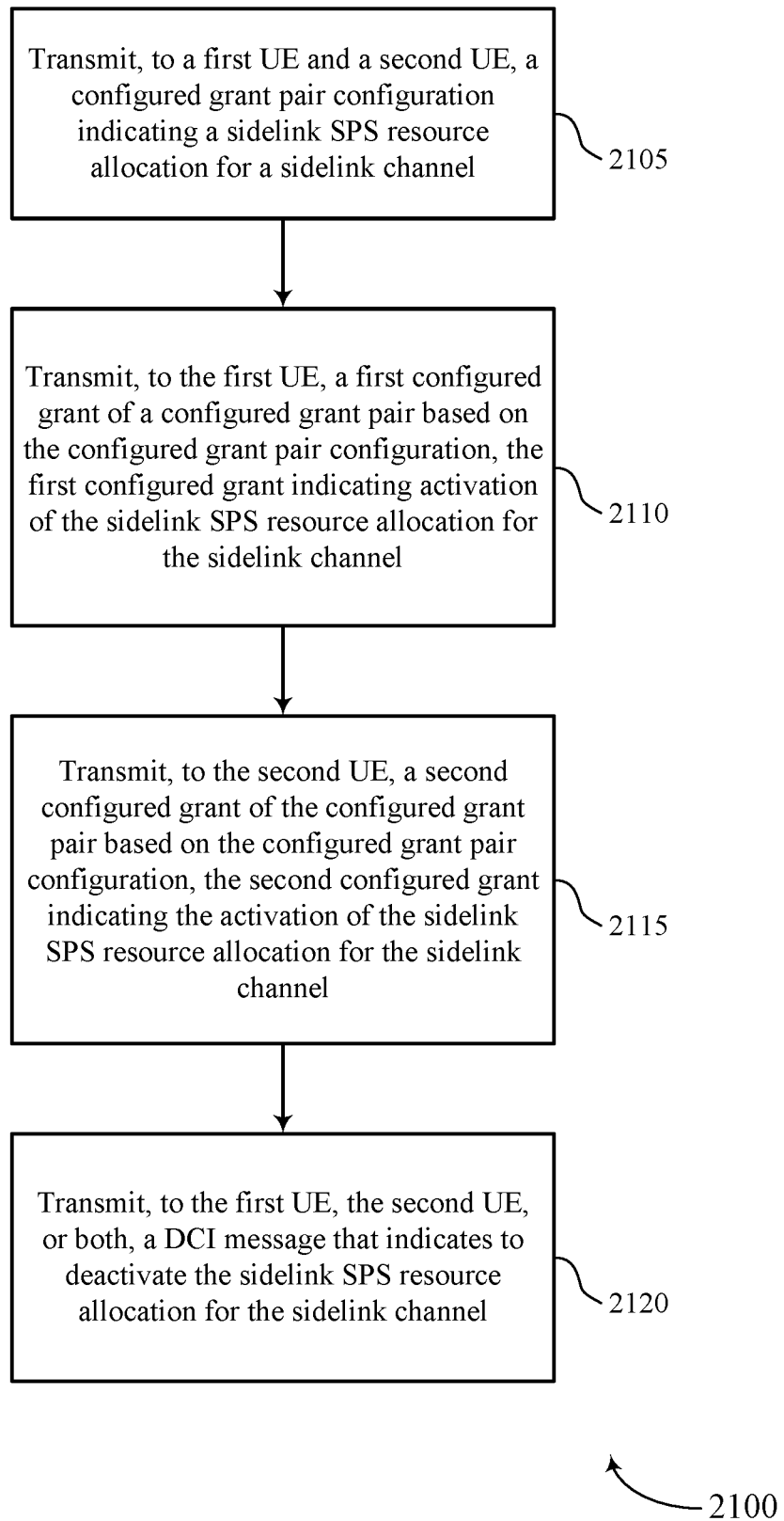

FIG. 21 shows a flowchart illustrating a method 2100 that supports SPS configurations for sidelink communications in accordance with aspects of the present disclosure. The operations of method 2100 may be implemented by a base station 105 or its components as described herein. For example, the operations of method 2100 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2105, the base station may transmit, to a first UE and a second UE, a configured grant pair configuration indicating a sidelink SPS resource allocation for a sidelink channel. The operations of 2105 may be performed according to the methods described herein. In some examples, aspects of the operations of 2105 may be performed by a configured grant pair configuration component as described with reference to FIGS. 10 through 13.

At 2110, the base station may transmit, to the first UE, a first configured grant of a configured grant pair based on the configured grant pair configuration, the first configured grant indicating activation of the sidelink SPS resource allocation for the sidelink channel. The operations of 2110 may be performed according to the methods described herein. In some examples, aspects of the operations of 2110 may be performed by a first configured grant component as described with reference to FIGS. 10 through 13.

At 2115, the base station may transmit, to the second UE, a second configured grant of the configured grant pair based on the configured grant pair configuration, the second configured grant indicating the activation of the sidelink SPS resource allocation for the sidelink channel. The operations of 2115 may be performed according to the methods described herein. In some examples, aspects of the operations of 2115 may be performed by a second configured grant component as described with reference to FIGS. 10 through 13.

At 2120, the base station may transmit, to the first UE, the second UE, or both, a downlink control information message that indicates to deactivate the sidelink SPS resource allocation for the sidelink channel. The operations of 2120 may be performed according to the methods described herein. In some examples, aspects of the operations of 2120 may be performed by a sidelink SPS resource deactivation component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving, from a base station, a configured grant pair configuration indicating a sidelink semi-persistent scheduling resource allocation for a sidelink channel; receiving, from the base station, a first configured grant of a configured grant pair based at least in part on the configured grant pair configuration, the first configured grant indicating an activation of the sidelink semi-persistent scheduling resource allocation for the sidelink channel; and communicating with a second UE on the sidelink channel according to the sidelink semi-persistent scheduling resource allocation based at least in part on the first configured grant.

Aspect 2: The method of aspect 1, wherein receiving the first configured grant comprises: receiving the first configured grant that indicates the UE is a transmitter for communications with the second UE on the sidelink channel.

Aspect 3: The method of aspect 2, wherein communicating with the second UE on the sidelink channel comprises: transmitting a sidelink message to the second UE via the sidelink semi-persistent scheduling resource allocation based at least in part on the first configured grant indicating that the UE is the transmitter.

Aspect 4: The method of any of aspects 2 through 3, wherein receiving the first configured grant comprises: receiving the first configured grant comprising a bit set to indicate the UE is the transmitter.

Aspect 5: The method of any of aspects 2 through 4, wherein receiving the first configured grant comprises: receiving the first configured grant in a downlink control information format that indicates the UE is the transmitter.

Aspect 6: The method of any of aspects 2 through 5, wherein receiving the first configured grant comprises: receiving the first configured grant comprising a cyclic redundancy check field scrambled with a radio network temporary identifier that indicates the UE is the transmitter.

Aspect 7: The method of any of aspects 1 through 6, wherein receiving the first configured grant comprises: receiving the first configured grant that indicates that the UE is a receiver for communications with the second UE on the sidelink channel.

Aspect 8: The method of aspect 7, wherein communicating with the second UE on the sidelink channel comprises: receiving a sidelink message from the second UE via the sidelink semi-persistent scheduling resource allocation based at least in part on the first configured grant indicating that the UE is the receiver.

Aspect 9: The method of any of aspects 7 through 8, wherein receiving the first configured grant comprises: receiving the first configured grant comprising a bit set to indicate the UE is the receiver.

Aspect 10: The method of any of aspects 7 through 9, wherein receiving the first configured grant comprises: receiving the first configured grant in a downlink control information format that indicates the UE is the receiver.

Aspect 11: The method of any of aspects 7 through 10, wherein receiving the first configured grant comprises: receiving the first configured grant comprising a cyclic redundancy check field scrambled with a radio network temporary identifier that indicates the UE is the receiver.

Aspect 12: The method of any of aspects 1 through 11, wherein receiving the first configured grant comprises: receiving the first configured grant comprising a new data indicator set to a first value and a resource assignment field set to a second value to indicate the activation of the sidelink semi-persistent scheduling resource allocation.

Aspect 13: The method of any of aspects 1 through 12, wherein receiving the first configured grant comprises: receiving the first configured grant comprising a field set to a first value to indicate the activation of the sidelink semi-persistent scheduling resource allocation.

Aspect 14: The method of any of aspects 1 through 13, further comprising: receiving, from the base station, a downlink control information message that indicates to deactivate the sidelink semi-persistent scheduling resource allocation for the sidelink channel.

Aspect 15: The method of aspect 14, further comprising: transmitting, to the base station, a confirmation message to acknowledge deactivation for the sidelink semi-persistent scheduling resource allocation for the sidelink channel based at least in part on receiving the downlink control information message.

Aspect 16: The method of aspect 15, wherein transmitting the confirmation message comprises: transmitting a medium access control (MAC) control element comprising the confirmation message.

Aspect 17: The method of any of aspects 1 through 16, wherein receiving the first configured grant comprises: receiving the first configured grant comprising a cyclic redundancy check scrambled with a radio network temporary identifier corresponding to the UE and an indication of the second UE for communications on the sidelink channel.

Aspect 18: The method of any of aspects 1 through 17, wherein receiving the first configured grant comprises: receiving an indication for a retransmission for communications on the sidelink channel according to the sidelink semi-persistent scheduling resource allocation based at least in part on a sidelink radio network temporary identifier specific to the UE used to scramble a cyclic redundancy check of the first configured grant, a new data indicator, a hybrid access request identifier field in the first configured grant, or a combination thereof.

Aspect 19: The method of any of aspects 1 through 18, wherein receiving the configured grant pair configuration comprises: receiving, from the base station, the configured grant pair configuration via a downlink control information message, radio resource control signaling, or a combination thereof.

Aspect 20: The method of any of aspects 1 through 19, wherein receiving the first configured grant of the configured grant pair comprises: receiving, from the base station, a downlink control information message comprising the first configured grant of the configured grant pair.

Aspect 21: The method of any of aspects 1 through 20, further comprising: transmitting, to the base station, a confirmation message to acknowledge the activation for the sidelink semi-persistent scheduling resource allocation for the sidelink channel based at least in part on receiving the first configured grant.

Aspect 22: The method of aspect 21, wherein transmitting the confirmation message comprises: transmitting a medium access control (MAC) control element comprising the confirmation message.

Aspect 23: A method for wireless communications at a base station, comprising: transmitting, to a first UE and a second UE, a configured grant pair configuration indicating a sidelink semi-persistent scheduling resource allocation for a sidelink channel; transmitting, to the first UE, a first configured grant of a configured grant pair based at least in part on the configured grant pair configuration, the first configured grant indicating activation of the sidelink semi-persistent scheduling resource allocation for the sidelink channel; and transmitting, to the second UE, a second configured grant of the configured grant pair based at least in part on the configured grant pair configuration, the second configured grant indicating the activation of the sidelink semi-persistent scheduling resource allocation for the sidelink channel.

Aspect 24: The method of aspect 23, wherein transmitting the first configured grant comprises: transmitting, to the first UE, the first configured grant indicating that the first UE is a transmitter for communications with the second UE on the sidelink channel.

Aspect 25: The method of aspect 24, wherein transmitting the first configured grant comprises: transmitting the first configured grant comprising a bit to indicate the first UE is the transmitter.

Aspect 26: The method of any of aspects 24 through 25, wherein transmitting the first configured grant comprises: transmitting the first configured grant in a downlink control information format that indicates the UE is the transmitter.

Aspect 27: The method of any of aspects 24 through 26, wherein transmitting the first configured grant comprises: transmitting the first configured grant comprising a cyclic redundancy check field scrambled with a radio network temporary identifier that indicates the UE is the transmitter.

Aspect 28: The method of any of aspects 23 through 27, wherein transmitting the second configured grant comprises: transmitting, to the second UE, the second configured grant indicating that the second UE is a receiver for communications with the first UE on the sidelink channel.

Aspect 29: The method of aspect 28, wherein transmitting the second configured grant comprises: transmitting the second configured grant comprising a bit set to indicate the second UE is the receiver.

Aspect 30: The method of any of aspects 28 through 29, wherein transmitting the second configured grant comprises: transmitting the second configured grant in a downlink control information format that indicates the second UE is the receiver.

Aspect 31: The method of any of aspects 28 through 30, wherein transmitting the second configured grant comprises: transmitting the second configured grant comprising a cyclic redundancy check field scrambled with a radio network temporary identifier that indicates the second UE is the receiver.

Aspect 32: The method of any of aspects 23 through 31, wherein transmitting each of the configured grant pair comprises: transmitting the first configured grant and the second configured grant that each comprise a new data indicator set to a first value and a resource assignment field set to a second value to indicate the activation of the sidelink semi-persistent scheduling resource allocation.

Aspect 33: The method of any of aspects 23 through 32, wherein transmitting each of the configured grant pair comprises: transmitting the first configured grant and the second configured grant that each comprise a field set to a first value to indicate the activation of the sidelink semi-persistent scheduling resource allocation.

Aspect 34: The method of any of aspects 23 through 33, further comprising: transmitting, to the first UE, the second UE, or both, a downlink control information message that indicates to deactivate the sidelink semi-persistent scheduling resource allocation for the sidelink channel.

Aspect 35: The method of aspect 34, further comprising: receiving, from the first UE, the second UE, or both, a confirmation message to acknowledge deactivation for the sidelink semi-persistent scheduling resource allocation for the sidelink channel based at least in part on transmitting the downlink control information message.

Aspect 36: The method of aspect 35, wherein receiving the confirmation message comprises: receiving a medium access control (MAC) control element comprising the confirmation message.

Aspect 37: The method of any of aspects 23 through 36, further comprising: transmitting an indication of a resource assignment for the sidelink semi-persistent scheduling resource allocation.

Aspect 38: The method of any of aspects 23 through 37, wherein transmitting each of the configured grant pair comprises: transmitting the first configured grant comprising a first cyclic redundancy check scrambled with a first radio network temporary identifier corresponding to the first UE and an indication of the second UE; and transmitting the second configured grant comprising a second cyclic redundancy check scrambled with a second radio network temporary identifier corresponding to the second UE and an indication of the first UE.

Aspect 39: The method of any of aspects 23 through 38, further comprising: transmitting an indication for a retransmission on the sidelink channel according to the sidelink semi-persistent scheduling resource allocation based at least in part on a first sidelink radio network temporary identifier specific to the first UE used to scramble a first cyclic redundancy check of the first configured grant, a second sidelink radio network temporary identifier specific to the second UE used to scramble a second cyclic redundancy check of the second configured grant, a new data indicator in each of the configured grant pair, a hybrid access request identifier field in each of the configured grant pair, or a combination thereof.

Aspect 40: The method of any of aspects 23 through 39, wherein transmitting the configured grant pair configuration comprises: transmitting, to the first UE, the second UE, or both, the configured grant pair configuration via a downlink control information message, radio resource control signaling, or a combination thereof.

Aspect 41: The method of any of aspects 23 through 40, wherein transmitting each of the configured grant pair comprises: transmitting, to the first UE, a first downlink control information message of coupled downlink control information messages comprising the first configured grant of the configured grant pair; and transmitting, to the second UE, a second downlink control information message of the coupled downlink control information messages comprising the second configured grant of the configured grant pair.

Aspect 42: The method of any of aspects 23 through 41, further comprising: receiving, from the first UE, the second UE, or both, a confirmation message to acknowledge the activation for the sidelink semi-persistent scheduling resource allocation for the sidelink channel.

Aspect 43: The method of aspect 42, wherein receiving the confirmation message comprises: receiving a medium access control (MAC) control element comprising the confirmation message.

Aspect 44: An apparatus for wireless communications at a UE, comprising a processor; memory coupled with the processor; and instructions stored in the memory and executable by the processor to cause the apparatus to perform a method of any of aspects 1 through 22.

Aspect 45: An apparatus for wireless communications at a UE, comprising at least one means for performing a method of any of aspects 1 through 22.

Aspect 46: A non-transitory computer-readable medium storing code for wireless communications at a UE, the code comprising instructions executable by a processor to perform a method of any of aspects 1 through 22.

Aspect 47: An apparatus for wireless communications at a base station, comprising a processor; memory coupled with the processor; and instructions stored in the memory and executable by the processor to cause the apparatus to perform a method of any of aspects 23 through 43.

Aspect 48: An apparatus for wireless communications at a base station, comprising at least one means for performing a method of any of aspects 23 through 43.

Aspect 49: A non-transitory computer-readable medium storing code for wireless communications at a base station, the code comprising instructions executable by a processor to perform a method of any of aspects 23 through 43.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
   receiving, from a network entity, a configured grant pair configuration indicating:
   a sidelink semi-persistent scheduling resource allocation for a sidelink channel for communicating with a second UE, and
   a first configured grant for the first UE and a second configured grant for the second UE, wherein the first configured grant and the second configured grant, of a configured grant pair, each indicate:
   an activation of the sidelink semi-persistent scheduling resource allocation for communications between the first UE and the second UE via the sidelink channel,
   which of the first UE or the second UE is a transmitter for communications between the first UE and the second UE on the sidelink channel, and
   which of the first UE or the second UE is a receiver for communications between the first UE and the second UE on the sidelink channel;
   receiving, from the network entity, the first configured grant of the configured grant pair based at least in part on the configured grant pair configuration; and
   communicating with the second UE on the sidelink channel according to the sidelink semi-persistent scheduling resource allocation based at least in part on the first configured grant.

2. The method of claim 1, wherein the first configured grant indicates that the first UE is the transmitter for communications with the second UE on the sidelink channel.

3. The method of claim 1, wherein communicating with the second UE on the sidelink channel comprises:
   transmitting a sidelink message to the second UE via the sidelink semi-persistent scheduling resource allocation based at least in part on the first configured grant indicating that the first UE is the transmitter.

4. The method of claim 1, wherein
   the first configured grant comprises a bit set to indicate that the first UE is the transmitter.

5. The method of claim 1, wherein receiving the first configured grant comprises:
   receiving the first configured grant in a downlink control information format that indicates that the first UE is the transmitter.

6. The method of claim 1, wherein
   the first configured grant comprises a cyclic redundancy check field scrambled with a radio network temporary identifier that indicates that the first UE is the transmitter.

7. The method of claim 1, wherein the first configured grant indicates that the first UE is the receiver for communications with the second UE on the sidelink channel.

8. The method of claim 1, wherein communicating with the second UE on the sidelink channel comprises:
   receiving a sidelink message from the second UE via the sidelink semi-persistent scheduling resource allocation based at least in part on the first configured grant indicating that the first UE is the receiver.

9. The method of claim 1, wherein
   the first configured grant comprises a bit set to indicate that the first UE is the receiver.

10. The method of claim 1, wherein receiving the first configured grant comprises:
    receiving the first configured grant in a downlink control information format that indicates that the first UE is the receiver.

11. The method of claim 1, wherein
    the first configured grant comprises a cyclic redundancy check field scrambled with a radio network temporary identifier that indicates that the first UE is the receiver.

12. The method of claim 1, wherein
    the first configured grant comprises a new data indicator set to a first value and a resource assignment field set to a second value to indicate the activation of the sidelink semi-persistent scheduling resource allocation.

13. The method of claim 1, wherein
the first configured grant comprises a field set to a first value to indicate the activation of the sidelink semi-persistent scheduling resource allocation.

14. The method of claim 1, further comprising:
receiving, from the network entity, a downlink control information message that indicates to deactivate the sidelink semi-persistent scheduling resource allocation for the sidelink channel.

15. The method of claim 14, further comprising:
transmitting, to the network entity, a confirmation message to acknowledge deactivation for the sidelink semi-persistent scheduling resource allocation for the sidelink channel based at least in part on receiving the downlink control information message.

16. The method of claim 15, wherein transmitting the confirmation message comprises:
transmitting a medium access control (MAC) control element comprising the confirmation message.

17. The method of claim 1, wherein
the first configured grant comprises a cyclic redundancy check scrambled with a radio network temporary identifier corresponding to the first UE and an indication of the second UE for communications on the sidelink channel.

18. The method of claim 1, wherein receiving the first configured grant comprises:
receiving an indication for a retransmission for communications on the sidelink channel according to the sidelink semi-persistent scheduling resource allocation based at least in part on a sidelink radio network temporary identifier specific to the first UE used to scramble a cyclic redundancy check of the first configured grant, a new data indicator, a hybrid access request identifier field in the first configured grant, or a combination thereof.

19. The method of claim 1, wherein receiving the configured grant pair configuration comprises:
receiving, from the network entity, the configured grant pair configuration via a downlink control information message, radio resource control signaling, or a combination thereof.

20. The method of claim 1, wherein receiving the first configured grant comprises:
receiving, from the network entity, a downlink control information message comprising the first configured grant.

21. The method of claim 1, further comprising:
transmitting, to the network entity, a confirmation message to acknowledge the activation of the sidelink semi-persistent scheduling resource allocation for the sidelink channel based at least in part on receiving the first configured grant.

22. The method of claim 21, wherein transmitting the confirmation message comprises:
transmitting a medium access control (MAC) control element comprising the confirmation message.

23. An apparatus for wireless communications at a first user equipment (UE), comprising:
one or more processors;
memory coupled with the one or more processors; and
instructions stored in the memory and executable by the one or more processors to cause the apparatus to:
receive, from a network entity, a configured grant pair configuration indicating:
a sidelink semi-persistent scheduling resource allocation for a sidelink channel for communicating with a second UE, and
a first configured grant for the first UE and a second configured grant for the second UE, wherein the first configured grant and the second configured grant, of a configured grant pair, each indicate:
an activation of the sidelink semi-persistent scheduling resource allocation for communications between the first UE and the second UE via the sidelink channel,
which of the first UE or the second UE is a transmitter for communications between the first UE and the second UE on the sidelink channel, and
which of the first UE or the second UE is a receiver for communications between the first UE and the second UE on the sidelink channel;
receive, from the network entity, the first configured grant of the configured grant pair based at least in part on the configured grant pair configuration; and
communicate with the second UE on the sidelink channel according to the sidelink semi-persistent scheduling resource allocation based at least in part on the first configured grant.

24. The apparatus of claim 23, wherein the first configured grant indicates that the first UE is the transmitter for communications with the second UE on the sidelink channel.

25. The apparatus of claim 23, wherein the instructions to communicate with the second UE on the sidelink channel are executable by the one or more processors to cause the apparatus to:
transmit a sidelink message to the second UE via the sidelink semi-persistent scheduling resource allocation based at least in part on the first configured grant indicating that the first UE is the transmitter.

26. The apparatus of claim 23, wherein
the first configured grant comprises a bit set to indicate that the first UE is the transmitter.

27. The apparatus of claim 23, wherein the instructions to receive the first configured grant are executable by the one or more processors to cause the apparatus to:
receive the first configured grant in a downlink control information format that indicates that the first UE is the transmitter.

28. The apparatus of claim 23, wherein
the first configured grant comprises a cyclic redundancy check field scrambled with a radio network temporary identifier that indicates that the first UE is the transmitter.

29. An apparatus for wireless communications at a first user equipment (UE), comprising:
means for receiving, from a network entity, a configured grant pair configuration indicating:
a sidelink semi-persistent scheduling resource allocation for a sidelink channel for communicating with a second UE, and
a first configured grant for the first UE and a second configured grant for the second UE, wherein the first configured grant and the second configured grant, of a configured grant pair, each indicate:
an activation of the sidelink semi-persistent scheduling resource allocation for communication between the first UE and the second UE via the sidelink channel, which of the first UE or the second UE is a transmitter for communication between the first UE and the second UE on the sidelink channel, and which of the first UE or the second UE is a receiver for communication between the first UE and the second UE on the sidelink channel;

means for receiving, from the network entity, the first configured grant of the configured grant pair based at least in part on the configured grant pair configuration; and means for communicating with the second UE on the sidelink channel according to the sidelink semi-persistent scheduling resource allocation based at least in part on the first configured grant.

30. A non-transitory computer-readable medium storing code for wireless communications at a first user equipment (UE), the code comprising instructions executable by one or more processors to:

receive, from a network entity, a configured grant pair configuration indicating:

a sidelink semi-persistent scheduling resource allocation for a sidelink channel for communicating with a second UE, and a first configured grant for the first UE and a second configured grant for the second UE, wherein the first configured grant and the second configured grant, of a configured grant pair, each indicate:

an activation of the sidelink semi-persistent scheduling resource allocation for communication between the first UE and the second UE via the sidelink channel, which of the first UE or the second UE is a transmitter for communication between the first UE and the second UE on the sidelink channel, and which of the first UE or the second UE is a receiver for communication between the first UE and the second UE on the sidelink channel;

receive, from the network entity, the first configured grant of the configured grant pair based at least in part on the configured grant pair configuration; and communicate with the second UE on the sidelink channel according to the sidelink semi-persistent scheduling resource allocation based at least in part on the first configured grant.

* * * * *